(12) United States Patent
Velasquez et al.

(10) Patent No.: US 6,805,179 B2
(45) Date of Patent: Oct. 19, 2004

(54) ARTICLE LAMINATING APPARATUS WITH OPERATION-ADJUSTING CARTRIDGE DETECTION AND/OR IMPROVED HEATING AND/OR IMPROVED CUTTING

(75) Inventors: Joseph Elijio Velasquez, Gilbert, AZ (US); Paul J. Lemens, Scottsdale, AZ (US); T. Charles Ensign, Jr., Scottsdale, AZ (US); Brian M. Causse, Phoenix, AZ (US)

(73) Assignee: Xyron, Inc., Scottsdale, AZ (US)

( * ) Notice: Subject to any disclaimer, the term of this patent is extended or adjusted under 35 U.S.C. 154(b) by 29 days.

(21) Appl. No.: 10/146,144

(22) Filed: May 16, 2002

(65) Prior Publication Data

US 2002/0179222 A1 Dec. 5, 2002

Related U.S. Application Data

(60) Provisional application No. 60/290,987, filed on May 16, 2001.

(51) Int. Cl.[7] .............................................. B32B 31/20
(52) U.S. Cl. ........................ 156/355; 156/353; 156/358; 156/359; 156/361; 156/522; 156/583.1
(58) Field of Search ................................ 156/353, 355, 156/358, 361, 367, 368, 378, 379, 364, 363, 582, 583.1, 522

(56) References Cited

U.S. PATENT DOCUMENTS

| 1,542,808 A | 6/1925 | Adams |
| 2,721,669 A | 10/1955 | Keely |
| 2,721,670 A | 10/1955 | Shenigo |
| 2,732,880 A | 1/1956 | Hawk |
| 2,783,839 A | 3/1957 | Rugg |
| 3,014,631 A | 12/1961 | Fischer et al. |
| 3,309,983 A | 3/1967 | Dresser |
| 3,404,057 A | 10/1968 | Heiart |
| 3,421,963 A | 1/1969 | Bombard et al. |
| 3,438,835 A | 4/1969 | Chen et al. |
| 3,453,169 A | 7/1969 | Buck et al. |
| 3,577,297 A | 5/1971 | Howard |
| 3,658,629 A | 4/1972 | Cramer et al. |

(List continued on next page.)

FOREIGN PATENT DOCUMENTS

| BE | 1 006 210 A6 | 6/1994 |
| DE | 200 12 519 U1 | 11/2000 |
| DE | 200 12 519 U | 11/2000 |

(List continued on next page.)

OTHER PUBLICATIONS

Copy of the International Search Report dated Feb. 20, 2003 issued in the counterpart International Application No. PCT/US02/15352.

*Primary Examiner*—Richard Crispino
*Assistant Examiner*—George R. Koch, III
(74) *Attorney, Agent, or Firm*—Pillsbury Winthrop LLP

(57) ABSTRACT

An article laminating apparatus is provided for use with a cartridge having a detectable element indicative of a characteristic of laminating materials. The apparatus includes a frame enabling the cartridge to be removably mounted thereto and an article processing assembly carried on the frame. A control system controls the article processing assembly to perform an article processing operation. The apparatus also includes a detector operable to detect the detectable element on the cartridge. The detector is operable to transmit a signal to the control system based on the detectable element on the cartridge. The control system is operable to adjust at least one parameter of the operation based on the signal.

18 Claims, 23 Drawing Sheets

U.S. PATENT DOCUMENTS

| | | | |
|---|---|---|---|
| 3,687,389 A | 8/1972 | Adams | |
| 3,701,493 A | 10/1972 | Welsch et al. | |
| 3,745,739 A | 7/1973 | Madsen et al. | |
| 3,762,251 A | 10/1973 | Madsen et al. | |
| 3,770,550 A | 11/1973 | Levitan | |
| 3,770,553 A | 11/1973 | Hannon | |
| 3,798,107 A | 3/1974 | Bright | |
| 3,840,420 A | 10/1974 | Sarcia | |
| 3,854,668 A | 12/1974 | Rudd | |
| 3,856,599 A | 12/1974 | Bylund | |
| 3,886,033 A | 5/1975 | MacDonald et al. | |
| 3,901,758 A | 8/1975 | Humphries | |
| 3,943,031 A | 3/1976 | Krueger et al. | |
| 3,989,575 A | 11/1976 | Davies et al. | |
| 4,025,380 A | 5/1977 | Bernardo | |
| 4,172,750 A | 10/1979 | Giulie | |
| 4,204,180 A | 5/1980 | Usui et al. | |
| 4,242,166 A | * 12/1980 | Izumihara | 156/351 |
| 4,260,444 A | 4/1981 | Fowler | |
| 4,274,903 A | 6/1981 | Mock | |
| 4,422,402 A | 12/1983 | Ogihara | |
| 4,451,320 A | 5/1984 | Marvel | |
| 4,491,492 A | 1/1985 | Hetherington | |
| 4,496,407 A | 1/1985 | Lowery, Sr. et al. | |
| 4,505,772 A | 3/1985 | Renz | |
| 4,585,509 A | 4/1986 | Obayashi | |
| 4,620,184 A | 10/1986 | Nedstedt | |
| 4,624,730 A | 11/1986 | Reyer et al. | |
| 4,659,419 A | 4/1987 | Miyake | |
| 4,743,325 A | 5/1988 | Miyake | |
| 4,772,353 A | 9/1988 | Weiss et al. | |
| 4,828,247 A | 5/1989 | Matsuo et al. | |
| 4,859,274 A | 8/1989 | Marvel | |
| 4,863,550 A | 9/1989 | Matsuo et al. | |
| 4,888,083 A | 12/1989 | Sumi et al. | |
| 4,947,472 A | 8/1990 | Maeda | |
| 4,961,808 A | 10/1990 | Candore | |
| 4,995,933 A | 2/1991 | Brussel | |
| 4,999,081 A | 3/1991 | Buchanan | |
| 5,026,172 A | 6/1991 | Candore | |
| 5,120,386 A | 6/1992 | Seki et al. | |
| 5,160,399 A | * 11/1992 | Ueda et al. | 156/359 |
| 5,232,538 A | 8/1993 | Liu | |
| 5,421,947 A | 6/1995 | Green | |
| 5,437,752 A | 8/1995 | Lang | |
| 5,445,700 A | 8/1995 | Uang | |
| 5,540,806 A | 7/1996 | Traise | |
| 5,580,417 A | 12/1996 | Bradshaw | |
| 5,584,962 A | 12/1996 | Bradshaw et al. | |
| 5,735,997 A | 4/1998 | Reinders | |
| 5,741,381 A | 4/1998 | Dolence et al. | |
| 5,853,531 A | 12/1998 | Murphy et al. | |
| 6,024,322 A | 2/2000 | Skelly et al. | |
| 6,135,384 A | 10/2000 | Skelly et al. | |
| 6,294,033 B1 | 9/2001 | Fukuoka et al. | |
| 6,315,020 B1 | 11/2001 | Seki | |
| 6,427,744 B2 | 8/2002 | Seki et al. | |
| 6,431,243 B1 | 8/2002 | Ito et al. | |
| 6,431,244 B1 | 8/2002 | Moriguchi et al. | |
| 6,523,592 B2 | 2/2003 | Kuki | |
| 6,550,516 B2 | 4/2003 | Moriguchi et al. | |
| 6,578,618 B2 | 6/2003 | Ito et al. | |
| 2001/0004922 A1 | 6/2001 | Seki et al. | |

FOREIGN PATENT DOCUMENTS

| | | |
|---|---|---|
| DE | 100 04 486 A1 | 8/2001 |
| EP | 0 085 793 | 8/1983 |
| EP | 1 046 495 A2 | 10/2000 |
| GB | 931183 | 7/1963 |
| JP | 11-245296 | 9/1999 |
| JP | 11-245297 | 9/1999 |
| JP | 11-245299 | 9/1999 |
| JP | 11-254528 | 9/1999 |
| JP | 11-278416 | 10/1999 |
| JP | 2000-37775 | 2/2000 |
| JP | 2000-168020 | 6/2000 |
| JP | 2000-263644 | 9/2000 |
| JP | 2000-272005 | 10/2000 |
| JP | 2001-79940 | 3/2001 |
| JP | 2001-79942 | 3/2001 |
| JP | 2001-79943 | 3/2001 |
| JP | 2001-79946 | 3/2001 |
| JP | 2001-96617 | 4/2001 |
| JP | 2001-96619 | 4/2001 |
| JP | 2001-278517 | 10/2001 |
| JP | 2004-277357 | 10/2001 |
| WO | WO95/00430 | 1/1995 |
| WO | WO 01/56787 A1 | 8/2001 |

* cited by examiner

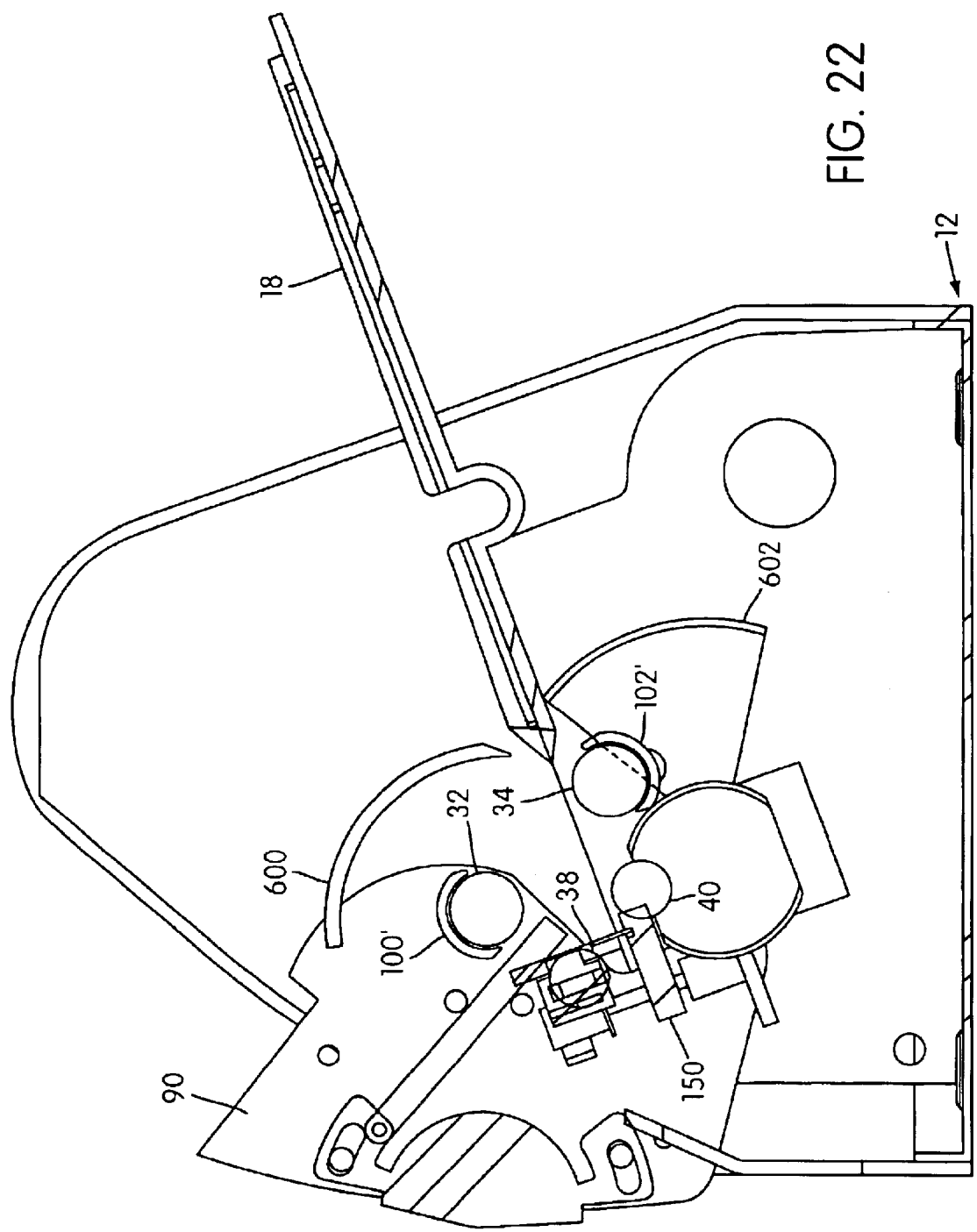

ARTICLE LAMINATING APPARATUS WITH OPERATION-ADJUSTING CARTRIDGE DETECTION AND/OR IMPROVED HEATING AND/OR IMPROVED CUTTING

The present application claims priority to U.S. Provisional Application Ser. No. 60/290,987, filed May 16, 2001, the entirety of which is hereby incorporated into the present application by reference.

FIELD OF THE INVENTION

The present invention relates to article laminating apparatuses.

BACKGROUND AND SUMMARY OF THE INVENTION

Laminating apparatuses typically include a pair of feed rolls, which carry a supply of laminating material. The laminating material is fed from these feed rolls (the feed rolls may be mounted to the frame individually or in a cartridge) into a processing assembly in which a processing operation bonds the materials to one another and to respective sides of an article for lamination inserted into the processing assembly. Traditionally, one or both of the laminating materials have an adhesive on one side. The adhesive may be self-adhering or heat activated. In the case that the adhesive being used in the processing operation is self-adhering, the processing assembly need only compress the materials to each other and to the article to cause bonding. This is usually accomplished with nip, or bonding, rollers. However, in the case that the adhesive being used is a heat activating type, the processing assembly must add heat to the materials prior to or during compression in order to instill a sufficiently strong bond between the materials and the article.

Along with various types of adhesives, laminating materials may also have various thicknesses. In heat laminating, the processing operation with relatively thick laminating material may require a somewhat longer time period to perform, since the material must be heated for a longer duration than with thinner laminating material. Alternatively, the temperature of the heater could be increased so that less time is needed to activate the adhesive. Also, the pressure applied to the materials may vary with the material thickness and/or the types of adhesive used. As such, laminating apparatuses have been designed that are capable of varying the feed speed, pressure and/or the operating temperature at which it operates in order to accommodate laminating materials with different thicknesses. However, these machines require the user to know the laminating material thickness and/or adhesive type and manually set adjustments of the machine (i.e., feed rate, pressure and/or heating temperature) according to appropriate values.

To obviate the need for the user to know these characteristics and manually adjust settings of the machine, one aspect of the present invention provides a laminating apparatus for use with a cartridge having a detectable element indicative of a characteristic of the laminating materials in the cartridge (the term a characteristic encompasses one or more than one characteristic). The article laminating apparatus of the present invention provides a frame constructed and arranged to removably mount the cartridge thereto. An article processing assembly is carried on the frame such that, when the cartridge is removably mounted thereto, an article can be inserted into the article processing assembly in a feeding direction together with the laminating materials unwound from their respective feed rolls and disposed on opposing sides of the article. The article processing assembly includes cooperating pressure applying structures and one or more heating elements. A control system controls the article processing assembly to perform an article processing operation. In the article processing operation, a temperature of the one or more heating elements is elevated to enable the adhesive to adhere to the article inserted into the processing assembly and the cooperating pressure applying structures apply pressure to the laminating materials and the article to affect adhesive bonding therebetween.

The apparatus further comprises a detector operable to detect the detectable element on the cartridge. The detector is communicated to the control system and transmits a signal indicative of the characteristic of the laminating material based on the detectable element on the cartridge. The control system is operable to adjust at least one parameter of the article processing operation based on the signal indicative of the characteristic of the laminating materials.

The parameter(s) adjusted may include the temperature of the one or more heating elements, the feed rate at which the article and the laminating materials are advanced through the apparatus, the pressure applied by the cooperating pressure applying structures, or any other parameter of the processing operation. Of course, the term at least one parameter is intended to encompass any one of these parameters alone, or any combination of parameters of the operation.

Other related aspects of the invention are directed to a cartridge for use with such an apparatus, a system including a cartridge and an apparatus in combination, and a method of performing an article processing operation.

Another aspect of the present application relates to the construction of the heating device in a heat laminating apparatus. Conventionally, laminating apparatuses have generally utilized one of two distinct types of heat sources to heat heat-sensitive adhesive material. The first type is a platen-type heating element. Laminating apparatuses with platen-type heating elements usually have a pair of the heating elements that are positioned within the apparatus to heat the material as it leaves the feed rolls and prior to compression by the bonding rollers. The pair of heating elements are generally planar plates positioned in spaced relation to one another so that the material may be fed between them. The plates are heated by application of an electrical current. As such, the laminating material is heated by convection via the platen-type heating elements. Another type of commonly used heat source is a heated bonding roller. For this type of heat source, the bonding rollers themselves are heated and thereby serve to heat the laminating material by conduction while simultaneously compressing it.

This aspect of the present invention provides an article laminating apparatus that has an improved heating system, specifically combining the benefits of the two types described above. The apparatus is designed for use with a pair of feed rolls carrying a supply of laminating material to be unwound. At least one of the laminating materials includes a layer of adhesive provided thereon. The apparatus includes a frame constructed and arranged to enable the feed rolls to be mounted thereon. An article processing assembly is carried on the frame such that an article can be inserted into the article processing assembly in a feeding direction. The article processing assembly includes a pair of cooperating pressure applying structures and a pair of heating elements.

The heating elements have pressure applying structure heating portions positioned in heat transferring relation adjacent the respective pressure applying structures so as to transfer heat to the respective pressure applying structures. The heating elements also have laminating material heating portions positioned such that, when the laminating materials are unwound and fed between the pressure applying structures, the laminating material heating portions are positioned in heat transferring relation adjacent respective laminating materials. The laminating material heating portions generally extend adjacent a lengthwise portion of the respective laminating material extending between the pressure applying structures and the respective feed roll so as to transfer heat to the laminating material prior to advancing between the pressure applying structures.

The article processing assembly is constructed and arranged to perform an article processing operation wherein portions of the laminating materials are initially heated by the laminating material heating portions of the heating elements prior to advancement between the pressure applying structures. The article and laminating materials are further heated and simultaneously compressed between the pressure applying structures. The article laminating apparatus according to this aspect of the invention offers an improved heating capability, since the laminating materials are pre-heated (prior to advancement between the pressure applying structures) and then heated while having pressure applied thereto (while being advanced between the pressure applying structures). As such, the laminating materials have sufficient exposure time to the heating elements (e.g., are thoroughly heated so as to fully and uniformly activate the adhesive), which ensures that the laminating materials uniformly adhere to the article and/or each other.

Yet another aspect of the invention relates to a cutter system for a heat laminator. It is generally known in the art to provide a cutter for cutting the laminating material after the processing operation is performed. Cutters have been in the form of a guillotine-type cutter and sliding cutters. Guillotine-type cutters are advantageous in that they may quickly cut the complete width of the laminating material and are simple to manually operate. Slide cutters usually ride on a track with a vertically disposed blade that may be moved laterally across the width of the laminating material to cut it. Either of these cutters may be adequate to cut the laminating material while the material is stationary (i.e., not being fed through the apparatus). However, it has been found that neither of these cutters are well-suited for cutting the laminating material without stopping the feed of the material. As such, these cutters are not well-suited for use in heat laminators because stopping the feeding material results in excessive heat being applied to the portion of the film adjacent the heating elements during stoppage. This excessive heat can deform the laminating materials, thus ruining its appearance.

U.S. Pat. No. 4,743,325 of Miyake discloses a cutting system for a laminator that is capable of cutting while the film is being fed through the laminator. The cutting system of Miyake uses a cutter mounted to a pair of movable block members. The block members are mounted to the laminator to move in a film feeding direction relative thereto. The cutter extends between the block members parallel to a widthwise direction of the film (perpendicular to the film feeding direction). To cut the film, the block members are moved in the film feeding direction at a rate of speed equal to a film feed rate through the laminator. The cutter is then moved between the block members (perpendicular to the film feeding direction) to cut the film. As such, the film may be cut straight across without stopping the feed of film through the laminator. However, the cutting system of Miyake requires significant space, since the entire cutting system is moved in the feeding direction. Further, two drive systems are required to move the block members in the feeding direction and to move the cutter between the block members, respectively. As such, the cutting system of Miyake is relatively complex and expensive to manufacture.

To avoid these limitations, this aspect of the present invention provides an article laminating apparatus with an improved cutting system. The apparatus is designed for use with a pair of feed rolls carrying a supply of laminating material to be unwound. At least one of the laminating materials includes a layer of adhesive provided thereon. The article laminating apparatus includes a frame constructed and arranged to enable the feed rolls to be mounted thereto. An article processing assembly is carried within the frame such that, when the feed rolls are removably mounted thereto, an article can be inserted into the article processing assembly together with the laminating materials unwound from their respective feed rolls and disposed on opposing sides of the article. The article processing assembly includes cooperating pressure applying structures and one or more heating elements. A control system controls the article processing assembly to perform an article processing operation. In the article processing operation, a temperature of the one or more heating elements is elevated to a level sufficient to enable the adhesive to adhere to the article inserted into the processing assembly. The cooperating pressure applying structures apply pressure to the laminating materials and the article to affect adhesive bonding therebetween.

The apparatus further includes a cutter system including a blade mounted on a guide structure for a cutting movement to enable the blade to cut transversely through the bonded materials discharged from the article processing assembly. The guide structure is oriented at an angle with respect to a feeding direction in which the article and laminating materials advance through the article processing apparatus such that the blade moves along a cutting path oriented at the angle. The angle and a velocity at which the blade moves along the cutting path are related such that a velocity component at which the blade moves in the feeding direction along the cutting path is substantially identical to a feed rate at which the article and the laminating materials are advanced through the apparatus in the feeding direction so that the laminating materials are cut generally perpendicularly with respect to the feeding direction.

Other aspects, features, and advantages of the present invention will become apparent from the following detailed description, the accompanying drawings, and the appended claims.

BRIEF DESCRIPTION OF THE DRAWINGS

FIG. 22 is a cross-sectional view of the apparatus showing the upper frame member in a pivoted position with the removable cartridge removed from the apparatus and the lower heat shield in a deployed position.

DETAILED DESCRIPTION OF ILLUSTRATED EMBODIMENTS

Figure 1:
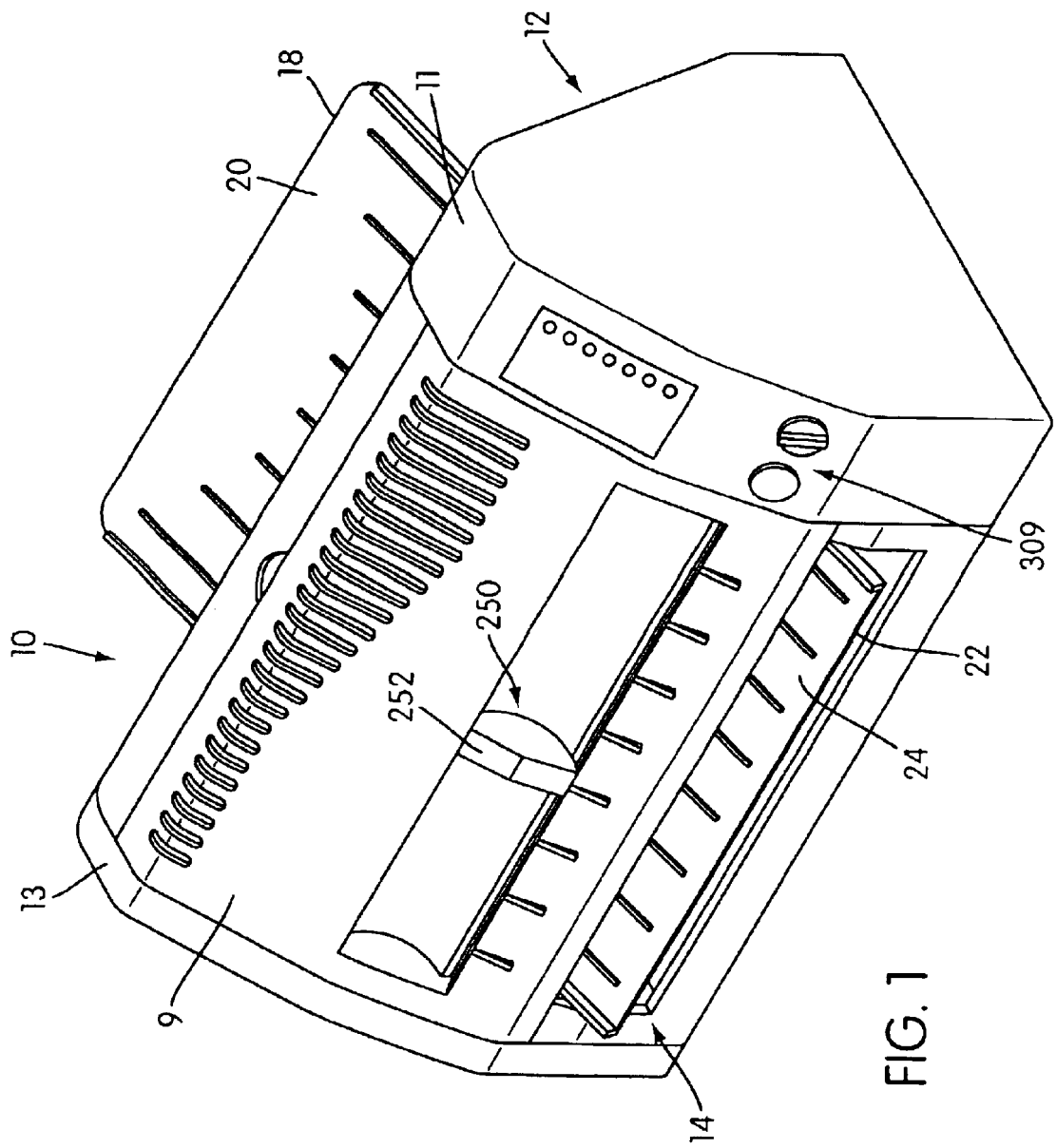
FIG. 1 is a front perspective view of the laminating apparatus of the present invention.
Figure 2:
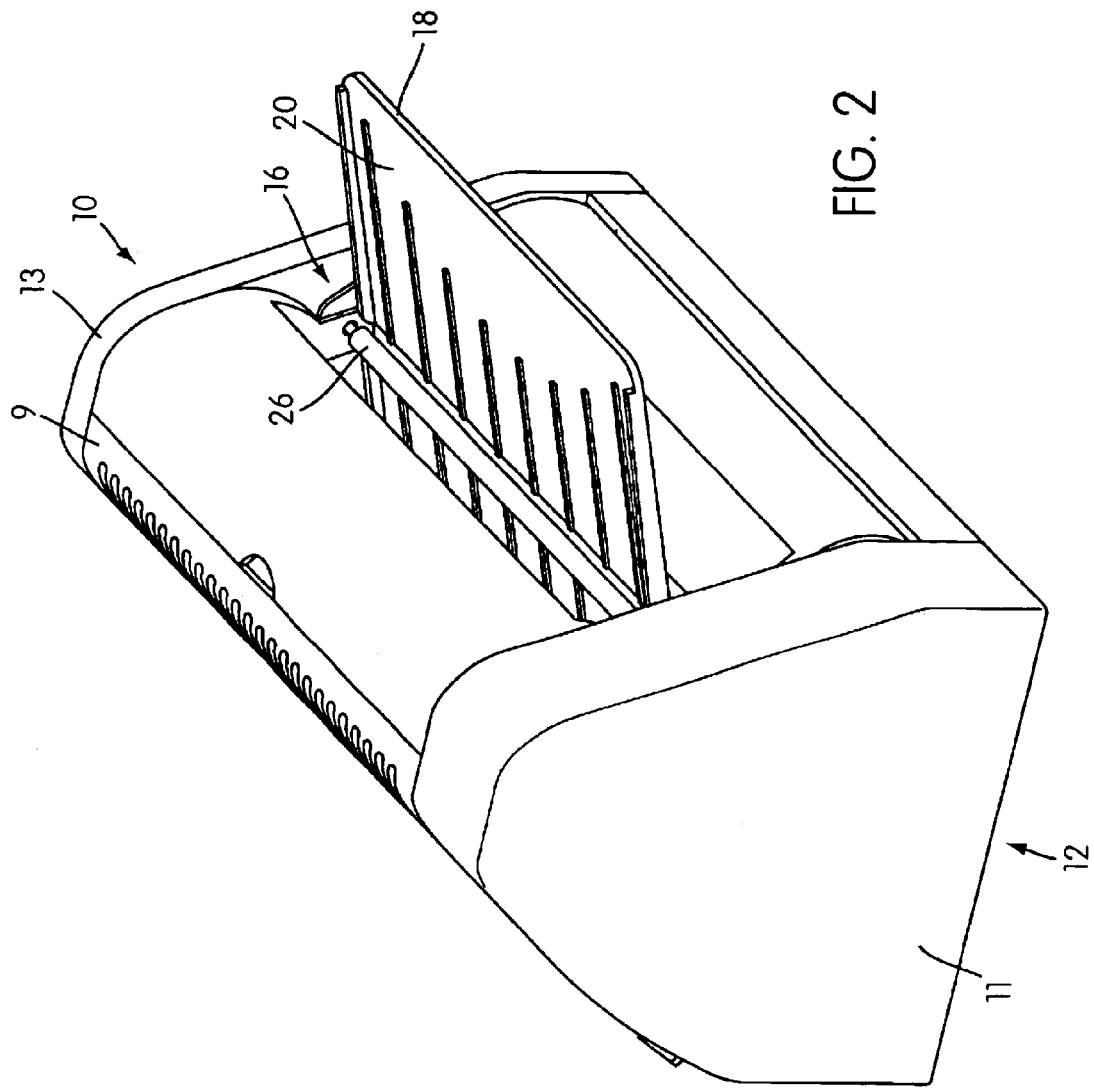
FIG. 2 is a rear perspective view of the laminating apparatus shown in FIG. 1.

An article laminating apparatus, generally designated 10, constructed according to the principles of the present invention is shown in FIGS. 1–4. As explained below, the article laminating apparatus 10 is constructed for use with a pair of removable feed rolls, each of which carries a supply of laminating material that is wound around a central core. The laminating materials can be, for example, a pair of transparent laminating films that are applied to opposing sides of a document, photograph or other article to be protected. The apparatus 10 is operable to unwind the supply of laminating material on each roll and apply the laminating material to respective sides of the article. At least one of the laminating materials has a layer of adhesive thereon which adheres the laminating materials to one another and the article therebetween.

FIGS. 1–5 depict the apparatus 10 with the heating elements and protective heat shields (which are discussed later) removed to show details of the apparatus 10.

The apparatus 10 includes a frame 12 that has a front panel 9 and a pair of spaced side panels 11 and 13. The front panel 9 provides an exit, or discharge, opening 14 (see FIG. 1) within a forward side of the frame 12. A rearward side of the frame 12 is provided with a feed opening 16 (see FIG. 2). It is noted that references to forward and rearward sides of the frame 12 (or apparatus 10) are relative to an article feeding direction. Further, it is noted that a lateral direction of the frame 12 (or apparatus 10) is perpendicular to the article feeding direction.

Figure 3:
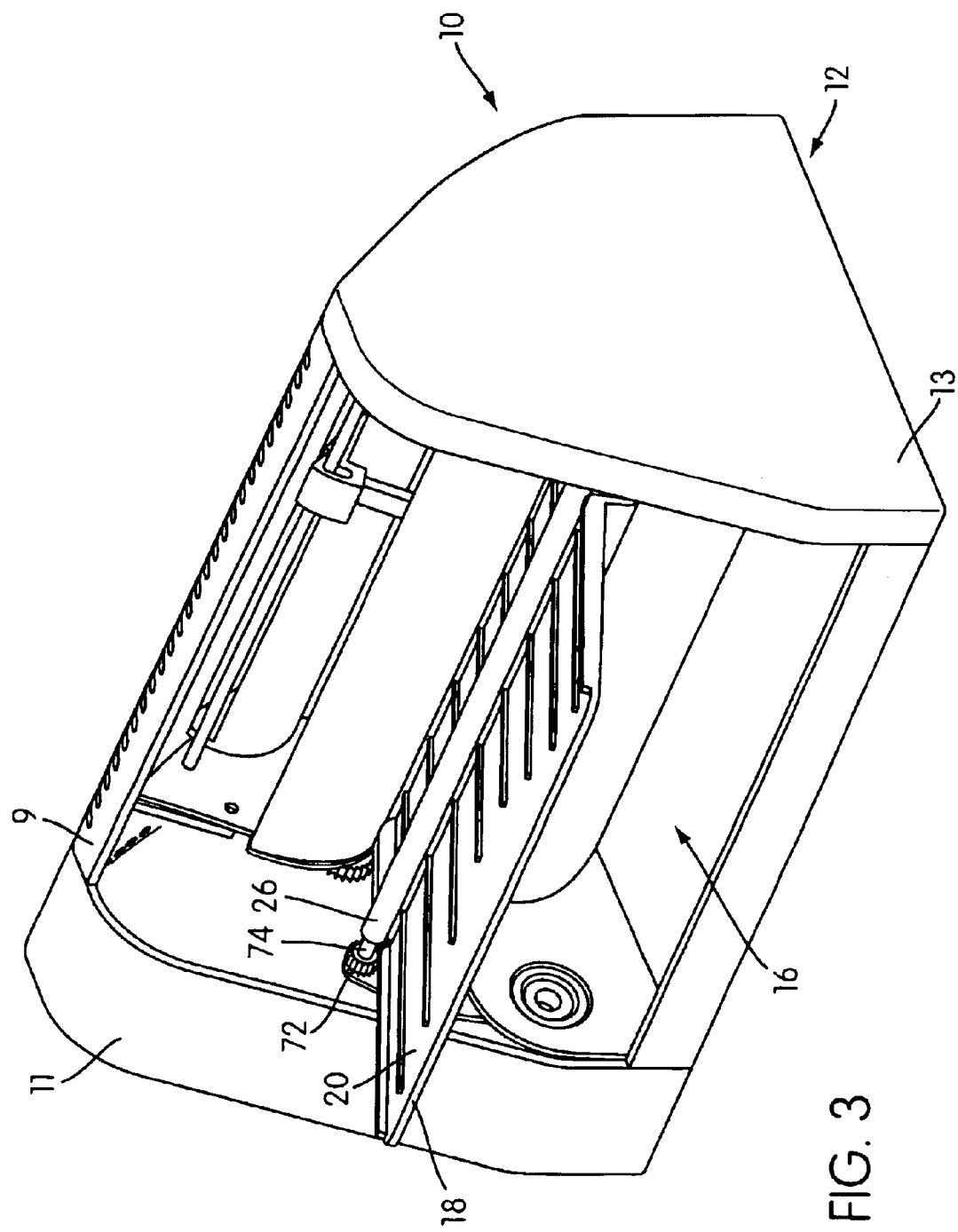
FIG. 3 is a rear perspective view of the laminating apparatus shown in FIG. 2 with the removable cartridge removed therefrom.
Figure 4:
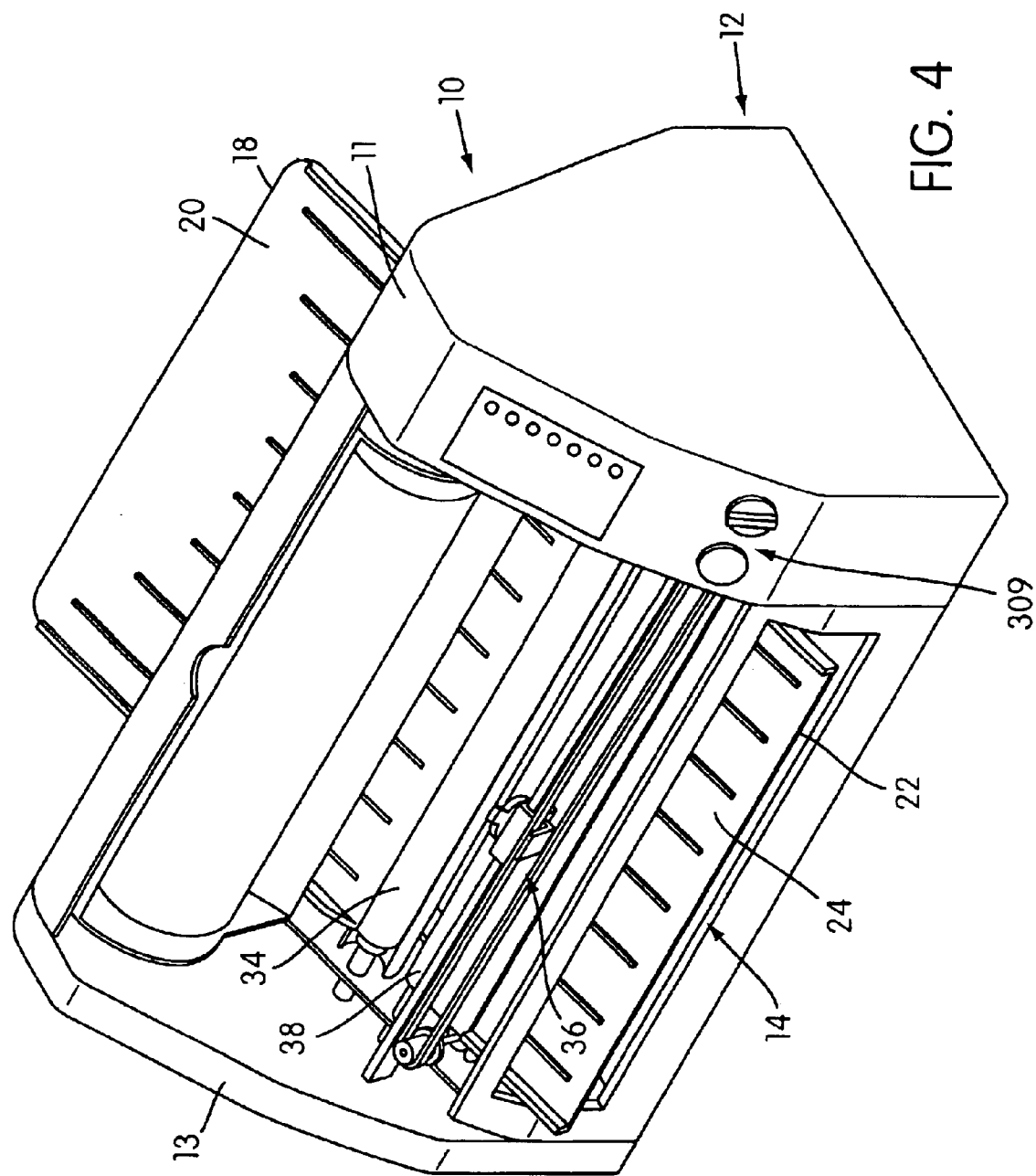
FIG. 4 is a front perspective view of the apparatus shown in FIG. 1 with the front panel removed therefrom.

A feed tray 18 having an article supporting surface 20 is shown connected to the frame 12 in FIG. 3. The feed tray 18 is mounted to the frame 12 so as to extend through and outwardly from the feed opening 16 and provide the article supporting surface 20 in a generally upwardly facing orientation. It is noted that FIG. 3 shows the apparatus 10 without the feed rolls in place. Referring to FIG. 4, a discharge tray 22 is connected to the frame 12 to extend generally outwardly from the discharge opening 14 and has a generally upwardly facing processed article supporting surface 24 thereon.

Figure 10:
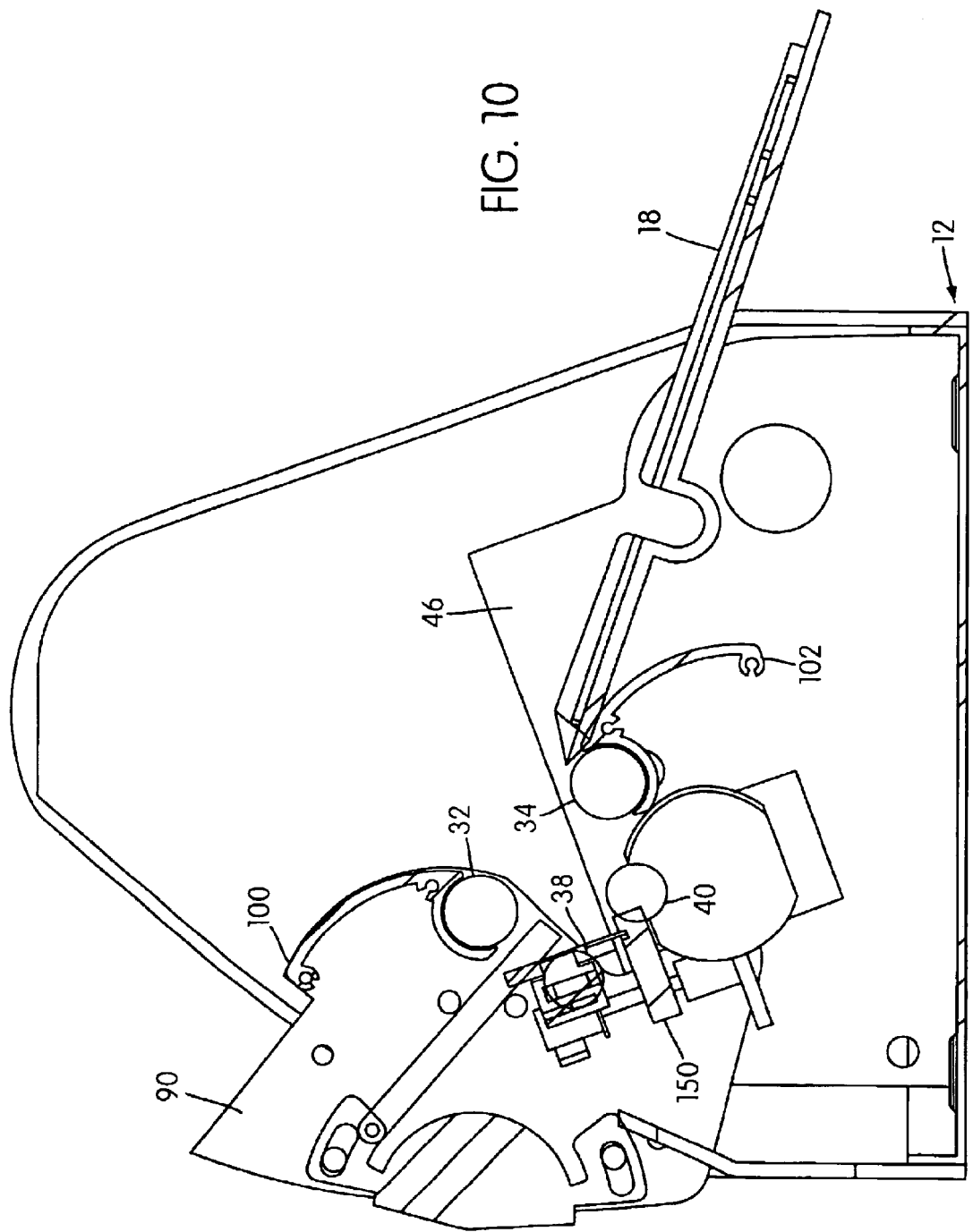
FIG. 10 is a cross-sectional view of the apparatus showing the upper frame member in a pivoted position with the removable cartridge removed from the apparatus.

FIG. 3 shows a pair of article feeding rollers 26 disposed adjacent and parallel to an inner end portion of the feed tray 18. As shown in FIGS. 4 and 10, the apparatus 10 includes a pair of cooperating pressure applying structures, in the form of nip rollers 32, 34 disposed parallel to the inner end portion of the feed tray 18 and to the article feeding rollers 26. As further shown in FIG. 4, the apparatus 10 includes a cutting system, or cutter, 36 mounted adjacent an inner end portion of the discharge tray 22. A pair of secondary drive rollers 38, 40 are mounted parallel to and spaced from the pressure applying rollers 32, 34.

Figure 5:
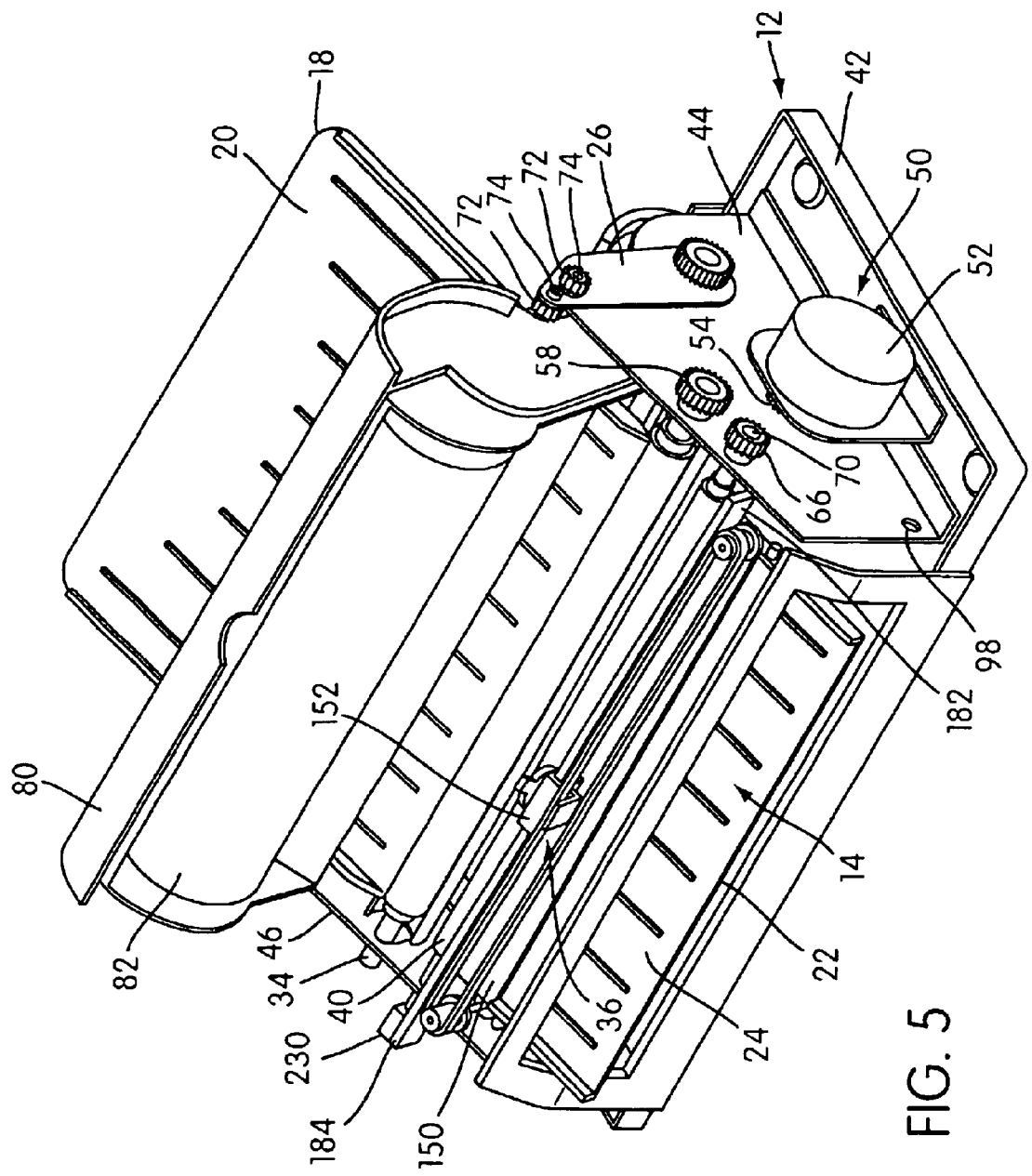
FIG. 5 is a front perspective view of the apparatus shown in FIG. 4 with the side panels additionally removed therefrom.

FIG. 5 shows the apparatus 10 with the front panel 9 and side covers 11, 13 removed. As shown in FIG. 5, the frame 12 includes a base member 42 and a pair of laterally spaced wall members 44, 46 extending upwardly from a top of the base member 42. The lower pressure applying roller 34, the lower secondary drive roller 40, and the lower of the pair of article feeding rollers 26 are rotatably connected at ends thereof to respective wall members 44, 46.

FIG. 5 also shows a drive system, generally indicated at 50, of the apparatus 10. The drive system 50 includes a drive motor 52 that is coupled to a series of drive members, which are coupled to the respective pressure applying rollers 32, 34, secondary drive rollers 38, 40, and article feeding rollers 26. As shown, the drive motor 52 has an initial drive member 54 connected at an end of an output shaft thereof. Shown in FIGS. 5 and 6, each of the pressure applying rollers 32, 34 has a driven member 56, 58 connected to respective drive ends 60, 62 thereof. Also shown in FIGS. 5 and 6, each of the secondary drive rollers 38, 40 has a driven member 64, 66 connected to respective drive ends 68, 70 thereof. Shown in FIGS. 3 and 5, each of the article feeding rollers 26 have drive members 72 on respective drive ends 74 thereof. The initial drive member 54 of the drive motor 52 is rotatably coupled to each of the drive members of the rollers with a coupling structure (not shown). The coupling structure may be in the form of an elastomeric drive belt or a gear drive system. In the case wherein the coupling structure is the drive belt, each of the drive members may be in the form of a cooperating pulley (may be toothed or smooth, depending on configuration of drive belt) with the drive belt in torque-transferring engagement with each of the drive members. In the case wherein the coupling structure is the gear drive system, each of the drive members may be in the form of intermeshed gear elements. Generally, the drive system 50 may have any suitable construction or configuration.

FIG. 5 shows a replaceable type cartridge 80 that is removably mountable to the frame 12 of the apparatus 10. The replaceable cartridge 80 contains a pair of feed rolls 82 therein. As described above, each of the feed rolls 82 may have wound thereon a supply of laminating material, such as a transparent polypropylene film.

Figure 6:
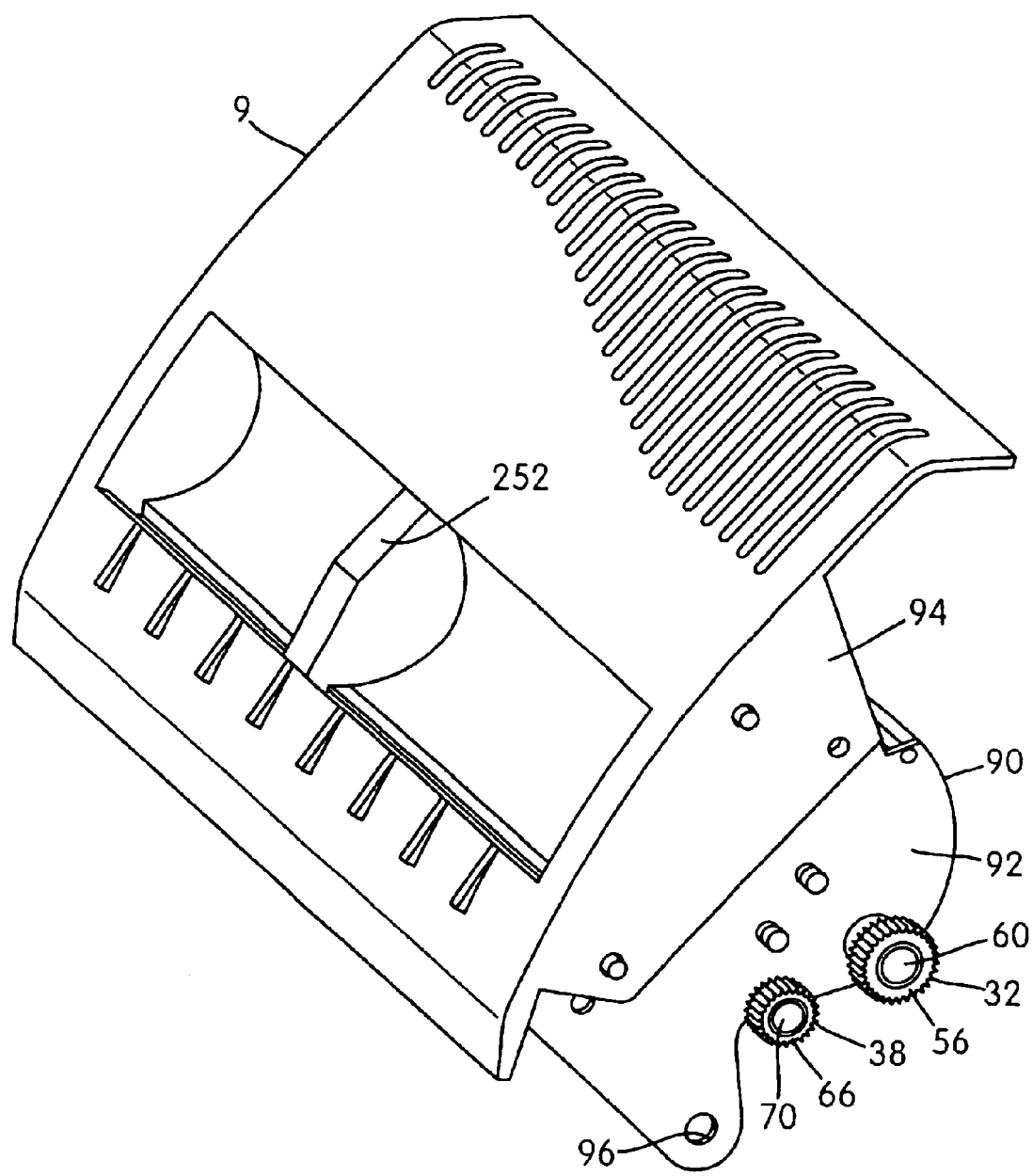
FIG. 6 is a front perspective view of the upper frame member and front panel.

FIG. 6 shows an upper frame portion 90, which has the front panel 9 mounted thereto. The upper frame portion 90 includes a pair of laterally spaced supporting walls 92 that are fixedly mounted to respective connecting members 94 of the front panel 9. Further, the supporting walls 92 are pivotally connectable with respective wall members 44, 46. Each of the supporting walls 92 includes a connecting recess or aperture 96. The upper frame portion 90 is positionable relative to the wall members 44, 46, such that the connecting recesses 96 align with cooperating openings 98 in wall members 44, 46. A connecting structure (not shown) may be passed through respective aligned openings 96, 98 such that the upper frame member 90 (including the front panel 9) is pivotal about the connecting structures. It is contemplated that suitable mechanical fasteners, such as screws or integrally molded snap connectors, may be used as the connecting structures.

Figure 7:
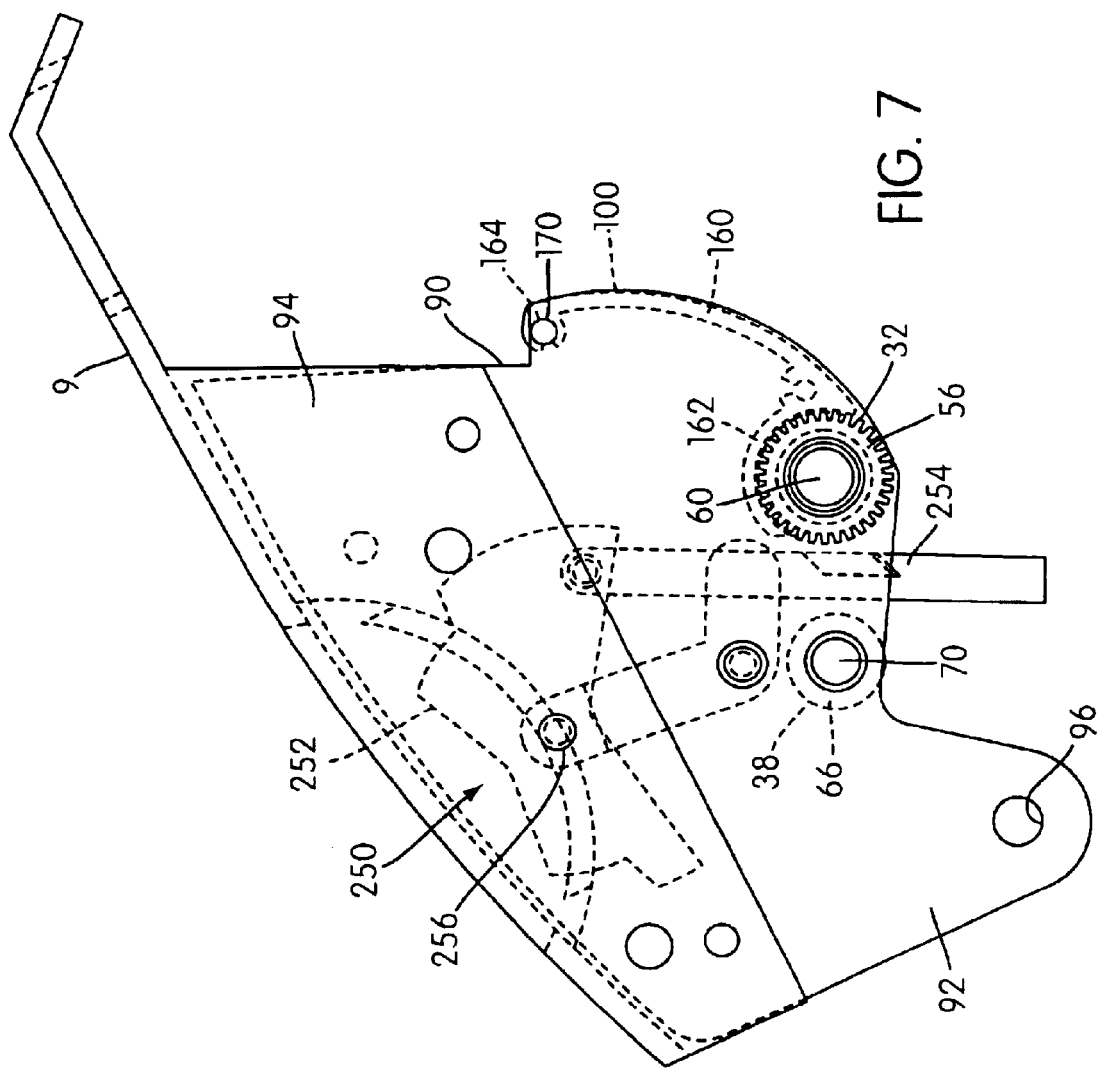
FIG. 7 is a side view of the upper frame member and front panel shown in FIG. 6 with the internal componentry indicated with hidden lines.
Figure 8:
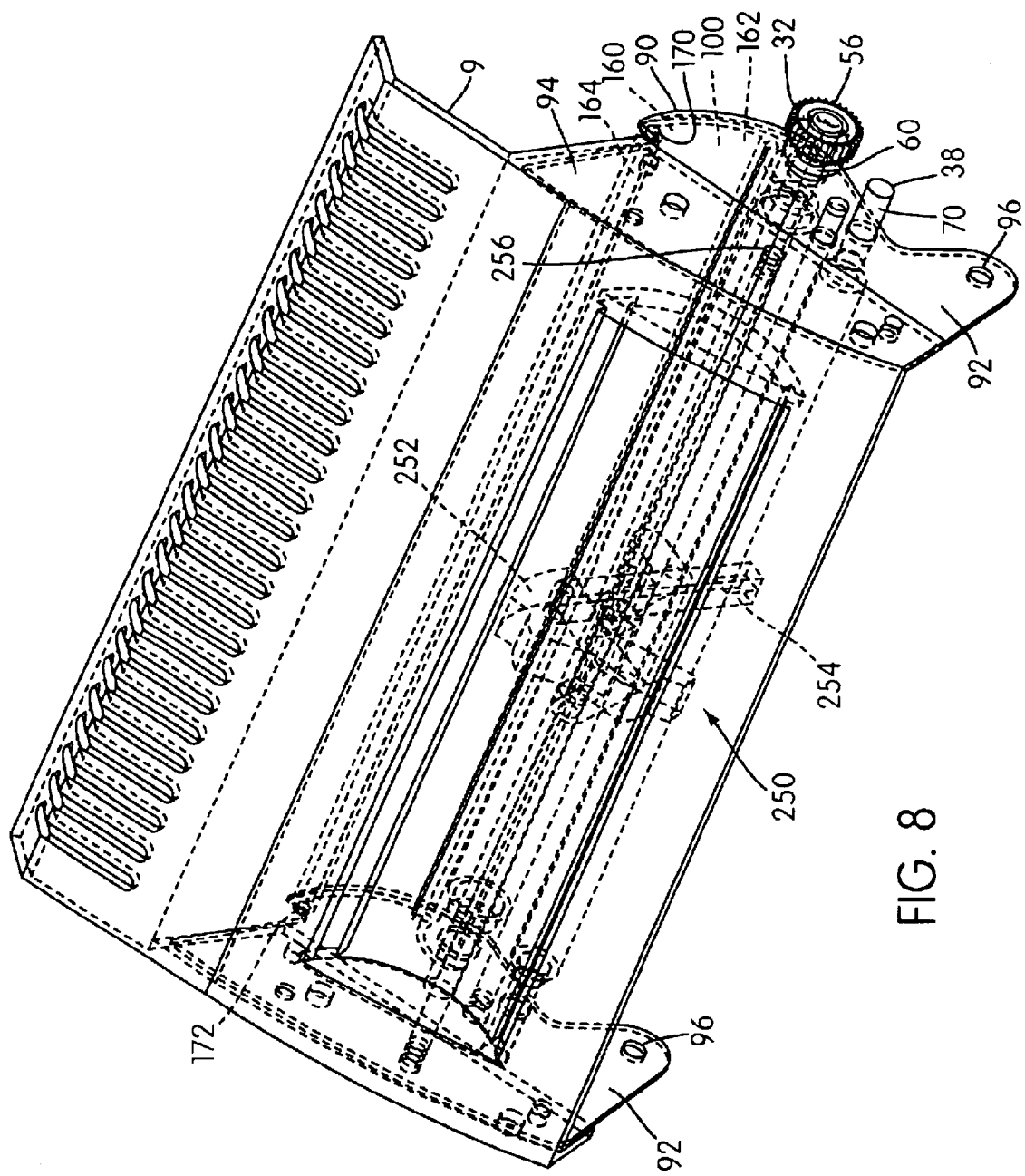
FIG. 8 is a top perspective view of the upper frame member shown in FIGS. 6 and 7 with the internal componentry indicated with hidden lines.

As shown in FIGS. 6–8, the upper frame portion 90 also has the upper pressure applying structure 32 and the upper secondary drive roller 38 rotatably mounted between respective supporting walls 92. As such, the upper pressure applying roller 32 and drive roller 38 may be pivoted with the upper frame portion 90.

Figure 9:
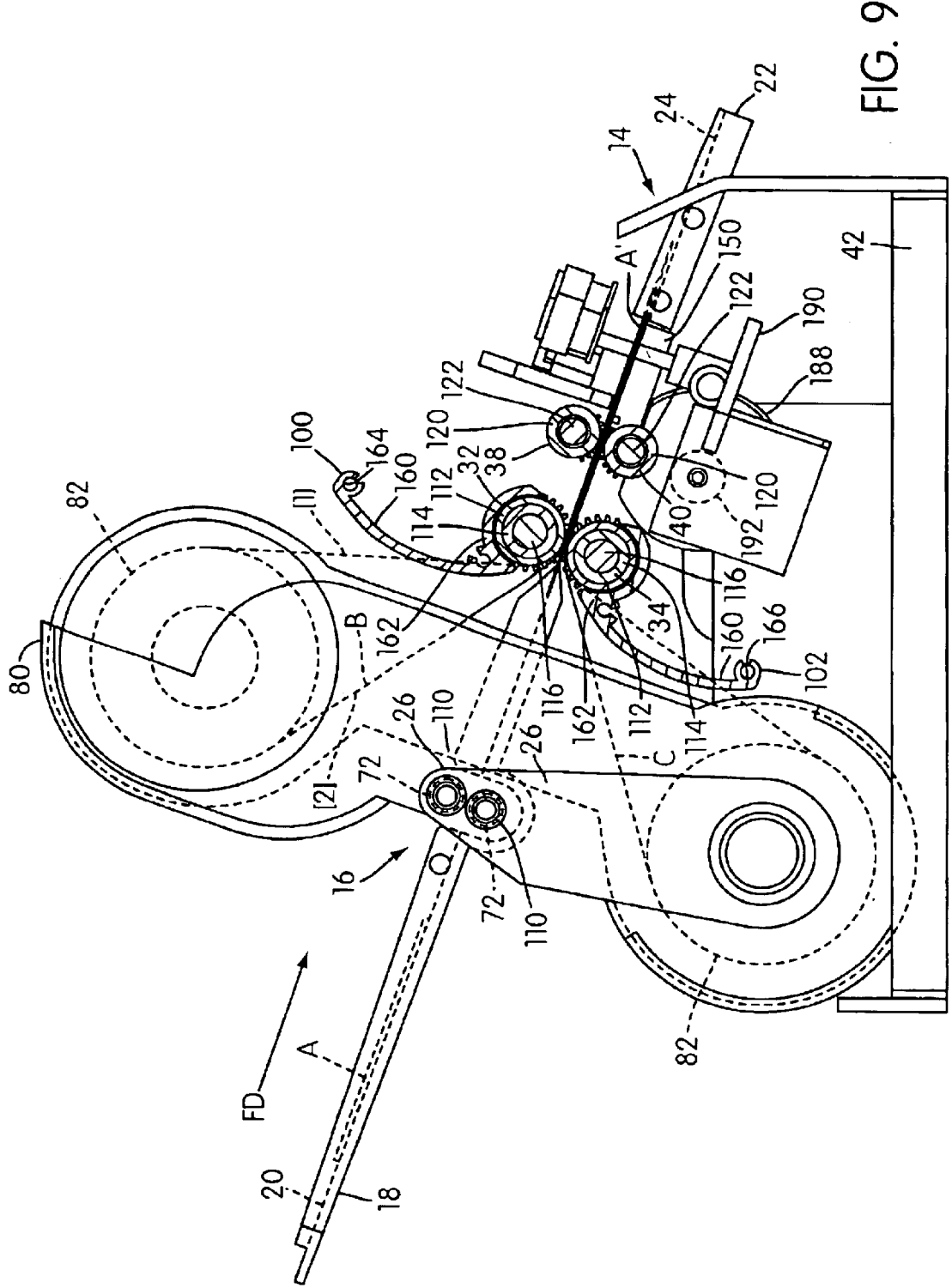
FIG. 9 is a cross-sectional view of the apparatus showing the upper frame member and side panels removed with the upper rollers in place.

FIGS. 7 and 8 show an upper heating structure, or heating element, 100 of a pair of heating structures, or heating elements, 100, 102. Heating element 102 is fixed on the lower frame portion 42 (i.e., the base 42 and is shown in FIG. 9). The heating elements 100, 102 are formed of a heat conductive material, preferable a metallic material. Each of the heating elements 100, 102 is selectively electrically connectable with a power source and is configured to convert electrical energy from the power source into heat energy. Specifically, a current is applied to the heating elements 100, 102 and the heating elements 100, 102 generally heat as a by-product of their material's resistance to electrical current flow.

To better appreciate the discussion of the structure of the apparatus 10, its basic operation will be briefly considered with reference to FIG. 9. FIG. 9 is a cross-sectional view of the apparatus 10 showing the upper and rollers 32, 34 and the upper and lower secondary drive rollers 38, 40. Also shown is the pair of removable feed rolls 82. It is noted that FIG. 9 shows the feed rolls 82 mounted within the replaceable cartridge 80. It is contemplated that, in lieu of the replaceable cartridge 80, the feed rolls 84 maybe removably mountable to the frame 12 or to the side covers 11 and 13.

An article, indicated at A in FIG. 9, (for example, a photo, card, document, etc.) is placed on the feed tray 18 and is supported on the article supporting surface 20. The feed tray 18 may optionally be inclined somewhat relative to the frame 12 (i.e., to the base member 42) so that the article A is predisposed to movement in the feed direction, indicated by arrow FD. The article A is moved, either by its own weight or manual manipulation thereof, down the article supporting surface 20 towards the article feeding rollers 26. The article feeding rollers 26 preferably have an outer periphery thereof formed of a frictional elastomeric material layer, such as indicated at 110. The article feeding rollers 26 may be propelled by the drive system 50 such that upper and lower article feeding rollers 26 rotate opposite each other in a direction to move the article A in the feed direction FD. The article feeding rollers 26 frictionally engage opposing sides of the article A to be capable of imposing a driving force on and movement of article A in the feed direction.

The pressure applying rollers 32, 34 each have, preferably, an outer frictional layer, indicated at 112 in FIG. 9 and a cylindrical central heat conductive core member 114. The heat conductive core member 114 may be formed of any heat conductive material; however, it is preferably formed of a metal. Each of the pressure applying rollers 32, 34 also each include a shaft member, or drive member, 116 extending through a central opening of the core member 114. The drive member 116 of the upper pressure applying roller 32 extends axially beyond each end of the core member 114 and is rotatably connected at ends thereof to respective supporting walls 92 of the upper frame portion 90 (see FIG. 8). The drive member 116 of the lower pressure applying structure 34 extends axially beyond each end of the core member 114 and is rotatably connected at ends thereof to respective wall members 44, 46 of the frame 12 (see FIG. 5). It is noted that the core member 114 and the drive member 116 may be integral, or one-piece, e.g., formed of a singular member.

As described above, the pressure applying rollers 32, 34 are rotated by the drive system 50 in opposite directions relative to each other such that laminating materials, indicated at B and C in FIG. 9, is unwound from respective feed rolls 82 and rolled together between the pressure applying rollers 32, 34. The article A is moved into a position adjacent the pressure applying rollers 32, 34 by the article feeding rollers 26, wherein laminating materials B, C contact respective sides of the article A. Subsequently, the article A is pulled between the pressure applying rollers 32, 34 and is thereby compressed between the laminating materials B, C and moved in the feed direction FD according to a driving speed of the pressure applying rollers 32, 34 (imposed by the drive system 50). The driving speed of the pressure applying rollers 32, 34 translates into a feed rate of the laminating materials B, C and article A. At least one of the laminating materials B, C is provided with an adhesive thereon. Accordingly, upon compression between the pressure applying rollers 32, 34, the laminating materials B, C are adhered to each other and at least one of the laminating materials B, C is adhered to the article A, thereby forming a processed article A'.

It is noted that the adhesive present on the at least one of the laminating materials B, C, may be a heat-activated type adhesive. The heat-activated adhesive discussed herein may be any adhesive that experiences an increase in adherence properties thereof when exposed to elevated temperatures. In this case, the heating elements 100, 102 are powered by the power source to emit heat at a predetermined temperature to effectively activate the adhesive. The manner in which the heat is distributed to the adhesive by the configuration of the heating elements 100, 102 will be described further below. It is also noted, though that for certain applications, the adhesive present on the at least one of the laminating materials B, C may also be an adhesive that does not require heat to increase adherence properties thereof. In this case, the heating elements 100, 102 may not be heated by the power source.

Subsequently, the processed article A', is moved toward the secondary drive rollers 38, 40. The secondary drive rollers 38, 40, preferably have a frictional elastomeric outer layer, indicated at 120, mounted on a drive member 122. The drive member 122 of the upper secondary drive roller 38 extends axially beyond each end of the frictional outer layer 120 and is rotatably connected at ends thereof to respective supporting walls 92 of the upper frame member 90 (see FIG. 8). The drive member 122 of the lower secondary drive roller 40 extends axially beyond each end of the frictional outer layer 120 and is rotatably connected at ends thereof to respective wall members 44, 46 of the frame 12 (see FIG. 5). Moreover, similarly to article feeding rollers 26 and pressure applying rollers 32, 34, the secondary drive rollers 38, 40 are rotated by the drive system 50. The upper and lower secondary drive rollers 38, 40 rotate in directions corresponding to respective upper and lower pressure applying rollers 32, 34. However, the secondary drive rollers 38, 40 are made to have a relatively faster tangential velocity than the pressure applying rollers 32, 34 either by decreasing a diameter of the driven members 66 of the secondary drive rollers 38, 40 relative to a diameter of the pressure applying rollers 32, 34 of by increasing a diameter of the rollers 38, 40 themselves, relative to the pressure applying rollers 32, 34. Due to the relatively faster moving secondary drive rollers 38, 40 the processed article A' is effectively tensioned between the pressure applying rollers 32, 34 and secondary drive rollers 38, 40.

FIG. 7 shows the upper frame member 90 and a slitting assembly 250. The slitting assembly 250 includes a manually operable rocking structure 252, which is connected to a blade member 254. As the processed article A' exits the pressure applying structures 32, 34, the blade member 254 may be positioned so as to trim one lateral edge of the processed article A' parallel to the feeding direction FD. As described above, the secondary drive rollers 38, 40 maintain a tension of the processed article A' between the pressure applying rollers 32, 34 and the secondary drive rollers 38, 40. The tension on-the processed article A' ensures that the blade member 254 trims the processed article A' cleanly and in a relatively straight manner, relative to an opposite lateral edge thereof. The rocking structure 252 may be manually moved between a sliding position, as shown in FIG. 7, and a locked position. In the sliding position, the rocking structure 252 is slidably movable along a guide member 256 of the upper frame member 90. In the locked position, the rocking structure 252 is substantially retained from sliding movement. As such, the user may move the rocking structure 252 laterally (relative to the apparatus 10) along the guide member 256 to a desirable trim position, such as that shown in FIG. 1, and then lock the rocking structure 252 in place.

Further shown in FIG. 9, the processed article A' is moved over a cutting platform 150 of the cutter 36. The cutting platform 150 is disposed adjacent and parallel to an innermost end portion of the discharge tray 22. A movable cutting member 152 is configured to move generally laterally across the cutting platform 150 to thereby cut the laminating materials B, C, once the processed article A' passes over the cutting platform 150. As such, the processed article A' may be cut free of the laminating materials B, C.

As discussed above and shown in FIG. 9, the apparatus 10 includes the pair of heating elements 100, 102. As shown, each of the heating elements 100, 102 includes a laminating material heating portion 160 and a roller heating portion 162. As shown in FIG. 9, the laminating material hearing portion 160 is slightly C-shaped with an arcuate configuration. On respective end portions thereof, the laminating material heating portions 160 form generally C-shaped fastener receiving recesses 164, 166 which extend the length of the respective heating elements 100, 102. Shown in FIG. 8, an elongated fastener 168 extends within the fastener receiving recess 164 and securely engages respective openings 170, 172 within respective supporting walls 92 of the upper frame member 90. Referring back to FIG. 9, each of the roller heating portions 162 have a substantially arcuate configuration, which conforms to exterior peripheries of respective pressure applying structures 32, 34.

When electrical power is delivered to the heating elements 100, 102, the laminating material heating portions 160 and the roller heating portions 162 are heated to a temperature corresponding to the amount of power delivered thereto. The heat emitted from the heating elements 100, 102 may be used to activate heat sensitive adhesive on the laminating materials B, C. When in operation, the laminating material heating portions 160 convectively emit heat outwardly therefrom. As such, the laminating materials B, C are convectively heated as they are unwound from respective feed rolls 82 prior to contacting the article A. In this manner, the laminating material heating portions 160 serve as platen-type heaters to "pre-heat" the laminating materials. Specifically, as can be appreciated from FIG. 9, the laminating materials B, C pass immediately adjacent the curved heating portions 160 so that they are heated prior to reaching the pressure applying rollers 32, 34. The roller heating portions 162 are positioned adjacent respective rollers 32, 34 and are configured to conform to partial outer peripheries thereof. As such, the heating elements 100, 102 heat the pressure applying rollers 32, 34, respectively. The pressure applying rollers 32, 34 are therefore capable of simultaneously heating the laminating materials B, C and compressing them with the article to facilitate forming a strong bond between the laminating materials B, C and the article A. Operationally, the laminating materials B, C are unwound from respective feed rolls 82. Prior to contact between the laminating materials B, C and the article A, the laminating materials are "pre-heated" by respective laminating material heating portions 160. Subsequently, the laminating materials B, C and the article A are engaged by the heated pressure applying rollers 32, 34, as described above. The heated pressure applying rollers 32, 34 further heat the laminating materials B, C, as the article A is being processed. As such, the laminating materials B, C and, more specifically, the heat sensitive adhesive is thoroughly and substantially uniformly heated prior to and simultaneously with the processing of the article A.

FIG. 10 shows the upper frame member 90 pivoted relative to the frame 12 such that the upper pressure applying roller 32 and the upper secondary roller 38 are relatively spaced from the cooperating respective lower pressure applying roller 34 and the lower secondary roller 40. Also shown, the replaceable cartridge 80 (and, therefore the feed rolls 82) are removed from the apparatus 10. In this open position, the replaceable cartridge 80 and/or the feed rolls 82 may be replaced, such as when changing between types of laminating materials and/or replacing empty feed rolls 82.

Figure 11:
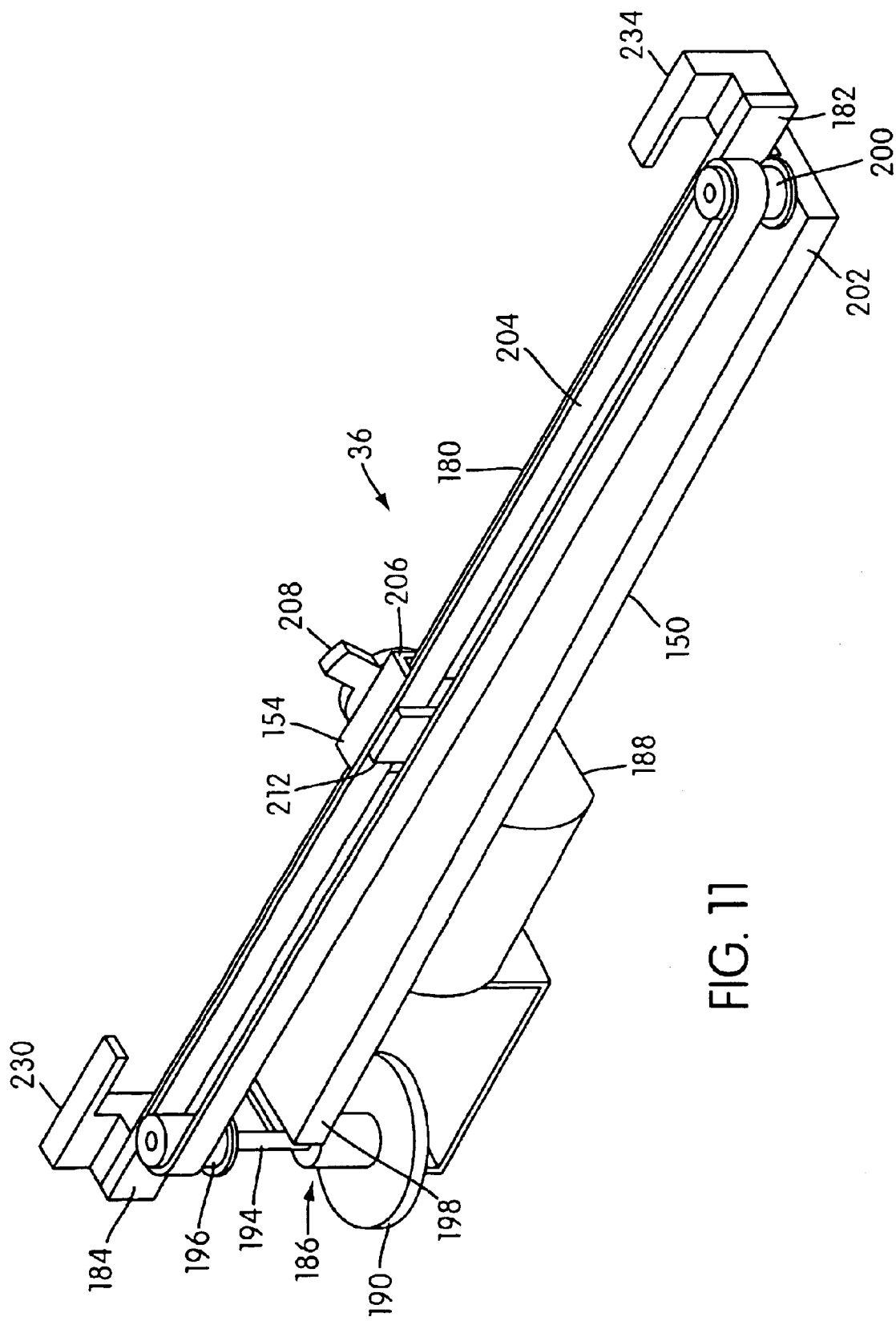
FIG. 11 is a rear perspective view of the cutting system.

Referring back to FIG. 5, the cutter 36 includes the cutting platform 150 and the movable cutting member 152. FIG. 11 is a more detailed view of the cutter 36. As shown, the movable cutting member 152 is slidably mounted on an elongated guide structure 180. As shown in FIG. 5, respective end portions 182, 184 of the guide structure 180 are connected to wall members 44, 46 of the frame 12. As further shown, the guide structure 180 is disposed in angled relation to the primary and secondary drive rollers 32, 34 and 38, 40 (i.e., angled relative to the feed direction). The end portion 184 is spaced relatively closer to the secondary feed rolls 38, 40 than the other end portion 182. As such, as the movable cutting member 152 moves in a direction from the end portion 184 toward the end portion 182 (from left to right, in FIG. 5), the movable cutting member 152 moves relatively farther away from the secondary drive rollers 38, 40.

FIG. 11 shows one contemplated drive assembly, indicated at 186, of the cutter 36. The drive assembly 186 includes a drive motor 188 that is coupled to a drive element 190. As shown in FIG. 9, the drive motor 188 has an output member 192 coupled to an output shaft thereof. The output member 192 engages the drive element 190 to thereby allow motion transfer between the drive motor 188 and the drive element 190. The drive element 190 is connected to one end of a shaft member 194. An opposite end of the shaft member 194 has a drive pulley 196 connected thereto, such that the drive pulley 196 is movable with the shaft element 190 responsive to the drive motor 188. The drive pulley 196 is positioned adjacent a first end portion 198 of the cutting platform 150. A follower pulley 200 of the cutting assembly 36 is rotatably mounted to an opposite end portion 202 of the cutting platform 150. A belt element 204 is engaged with the drive pulley 196 and the follower pulley 200 such that the belt is coupled and responsive to the drive motor 188.

Figure 12:
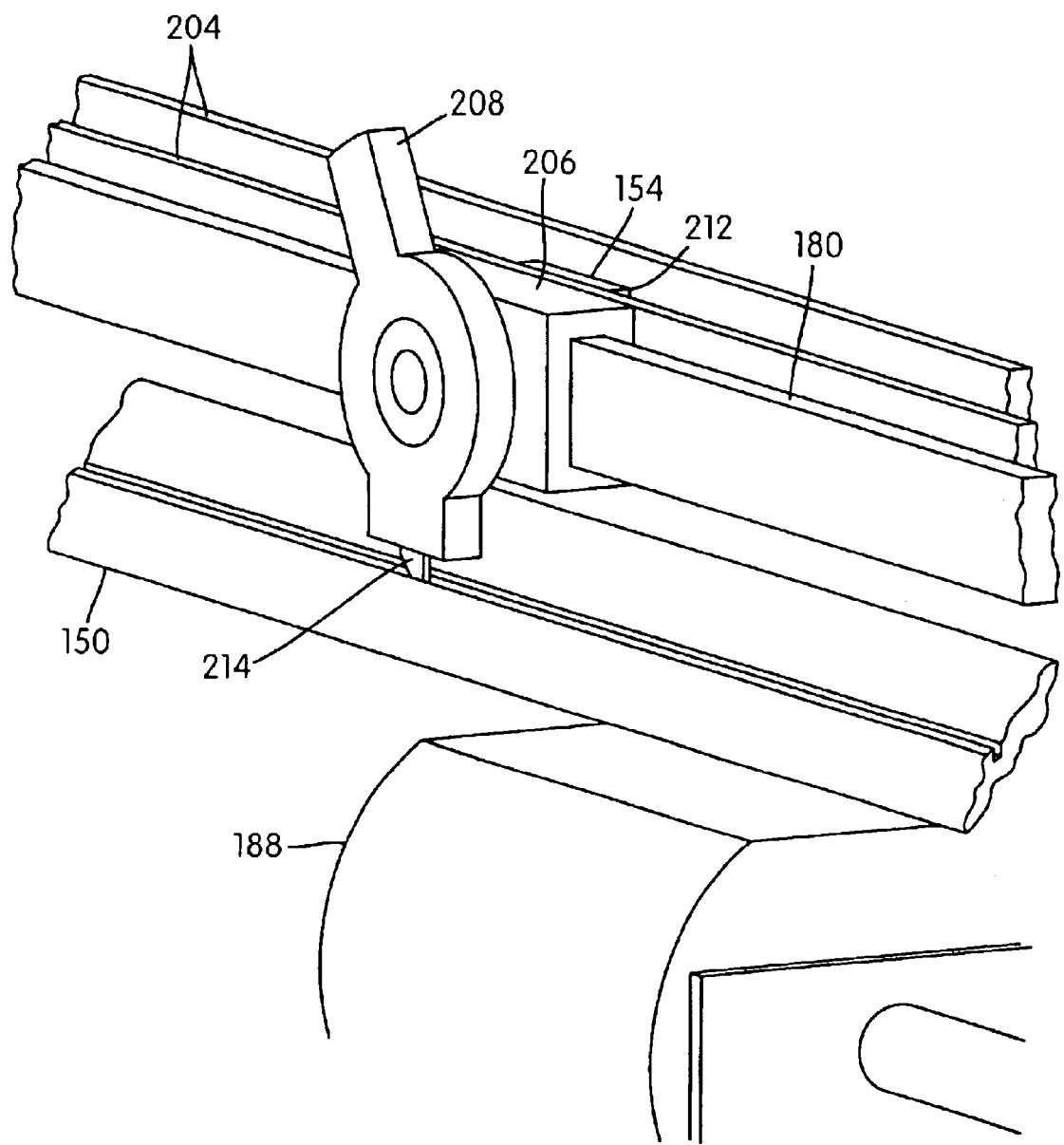
FIG. 12 is a front perspective view of the cutting system shown in FIG. 11.

The movable cutting member 154 includes a mounting member 206 and a pivotable tripping structure 208. As shown in FIG. 12, the mounting member 206 has a sliding opening 210 extending laterally therethrough. The guide member 180 extends within the sliding opening 210 so that the mounting member 206 may slide longitudinally along the guide member 180. The mounting member 206 also includes a connecting portion 212, which engages an inner side of the belt element 204. As such, the mounting member 206 is moved along the guide member 180 by movement of the belt member 204. In this manner, movement of the movable cutting member 154 may be affected and controlled by the drive motor 188.

The drive system 186 may be modified by providing a rack and pinion type system (not shown) to move the mounting member 206 along the guide member 180. More specifically, an elongated threaded rod may be utilized in lieu of the belt element 204. The sliding opening 210 may also be modified to provide a generally cylindrical opening that is threaded corresponding to the threaded rod. In this manner, the threaded rod may be rotated to threadedly move the mounting member 206 along the guide member 180.

Figure 13:
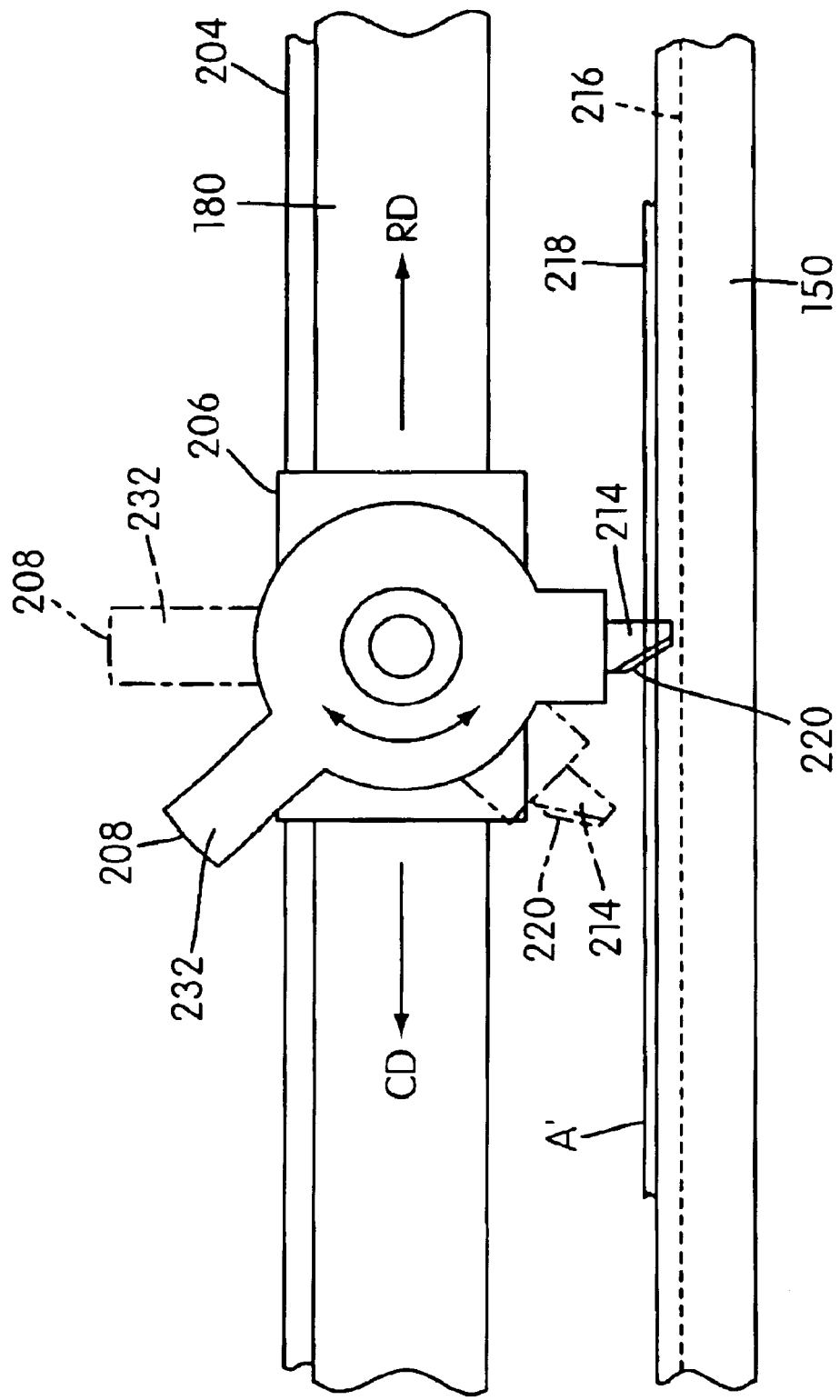
FIG. 13 is a front view of the cutting system shown in FIGS. 11 and 12 with the positions of the tripping member indicated.

Shown in FIG. 12, the tripping member 208 includes a blade structure 214 fixed thereto. FIG. 13 illustrates a cutting position of the tripping member 208, wherein a portion of the blade structure 214 is disposed within a groove 216 within an upper portion of the cutting platform 150. As shown, in the cutting position the blade structure 214 may pass through the entire thickness of the processed article A', since the groove ensures that the blade structure 214 completely extends through the processed article A'. A tripped, or pivoted position of the tripping member 208 is shown schematically in FIG. 13, wherein the blade structure 214 is disposed entirely above an upwardly facing surface 218 of the processed article A'. In this position, the processed article A' may pass along the cutting platform 150 without contact with the blade structure 214.

Figure 14:
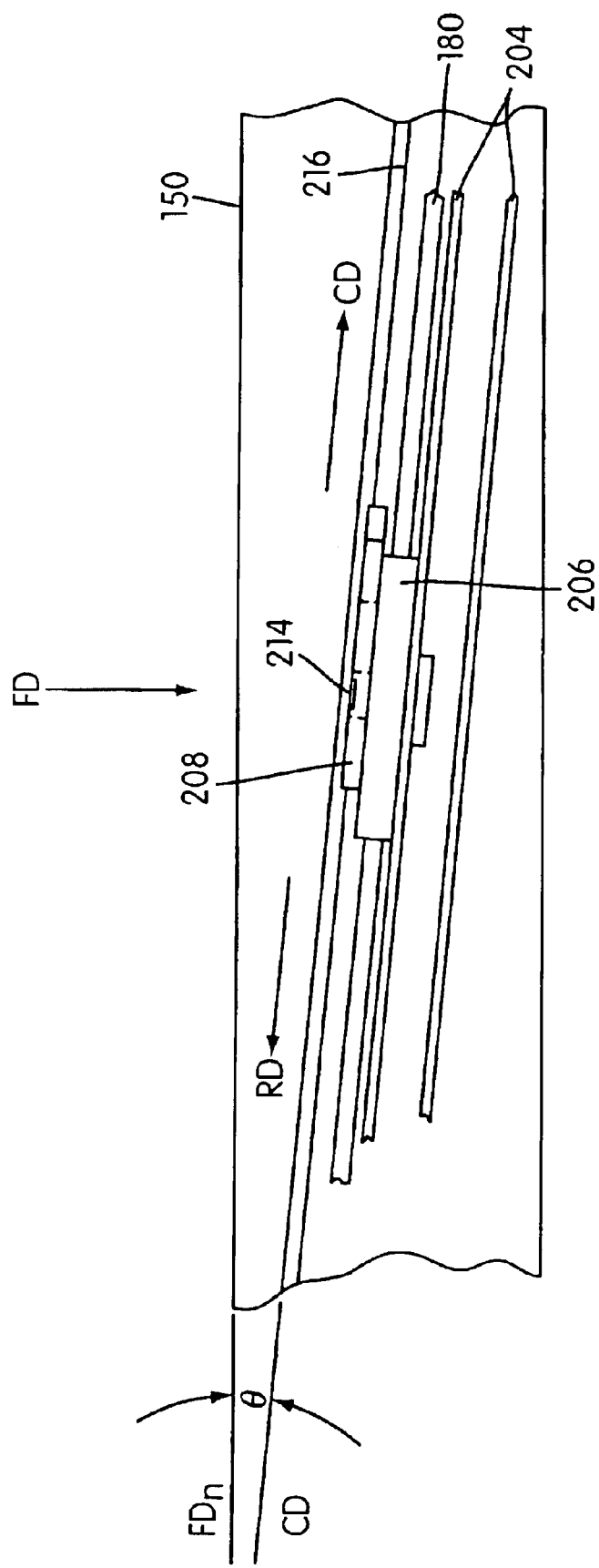
FIG. 14 is a top view of the cutting system shown in FIG. 13 showing the angle of the system relative to the normal of the feed direction.

As discussed previously, the mounting member 206 is movable with the belt element 204 and is therefore responsive to the drive motor 188. The drive motor 188 may be made to rotate to affect linear motion of the mounting member 206 in a cutting direction, indicated at CD in FIGS. 13 and 14, and a return direction, indicated at RD in FIGS. 13 and 14. As shown in FIG. 13, a substantially sharpened edge portion 220 of the blade structure 214 is configured thereon to face toward the cutting direction CD such that when the tripping member 208 is in the cutting position thereof, the blade structure 214 cuts through the processed article A'. As also shown in FIG. 13, when the tripping member 208 is in the tripped position thereof, the blade structure 214 is disposed above the processed article A' and may be moved in the return direction RD without contacting (e.g., cutting) or interfering with the processed article A'.

It is contemplated that the end portion 184 of the guide structure 180 may include a first tripper structure 230 thereon that is engagable with an arm member 232 of the tripping member 208, as shown in FIG. 11. Further, the end portion 182 of the guide structure 180 may include a second tripper structure 234 thereon that is also engagable with the arm member 232. A cutting operation is performed by the cutter 36 that moves the movable cutting member 154 in the cutting direction CD from the first end portion 198 of the cutting platform 150 toward the second end portion 202 of the cutting platform 150. The drive motor 188 is rotated in a first direction, which transmits to the movable cutting member 154 to move the movable cutting member 154 in the cutting direction CD. During this operation, the tripping member 208 is in the cutting position such that the blade structure 214 may cut the processed article A'. Upon reaching the second end portion 202, the arm member 232 of the tripping member 208 engages the second tripping structure 234 such that pivotal movement of the tripping member 208 is affected. As such, the tripping member 208 is moved into the tripped position and the drive motor 188 is reversed to rotate in a second direction so that the movable cutting member 154 moves in the return direction RD from the second end portion 202 of the cutting platform 150 towards the first end portion 198 of the cutting platform 150. Upon reaching the first end portion 198, the arm member 232 of the tripping member 208 engages the first tripping structure 230 such that pivotal movement of the tripping member 208 is affected. As such, the tripping member 208 is moved to the cutting position thereof. At this point rotation of the drive motor 188 may be stopped until it is desirable to perform the cutting operation again. It is contemplated that a rate of movement of the movable cutting member 154 (and, therefore the blade structure 214) may be controlled by the drive motor 188.

The guide member 180 and the groove 216 are disposed relative to the cutting platform 150 so as to define the cutting direction CD at an angle relative to the feeding direction FD. Shown in FIG. 14, an angle θ is formed between the cutting direction CD and a direction normal to the feed direction, indicated at FDn. Due to the angular nature of the cutting direction CD, a cutting speed of the cutter 36 is controlled by the drive motor 188 such that a rate of movement of the blade structure 214 in the feeding direction FD (note that the movement of the blade structure 214 in the feeding direction is a component of the movement thereof in the cutting direction) matches the feed rate of the processed article A'. As such, the cutting operation may be carried out while the processed article A' is still moving in the feed direction FD and the processed article A' may be cut perpendicularly without stopping movement thereof. Additionally, by manipulating the cutting speed of the cutter 36 along the cutting path (in the cutting direction CD), the cutter 36 is capable of transversely cutting the processed article A' for any feed rate of the processed article A'.

Figure 15:
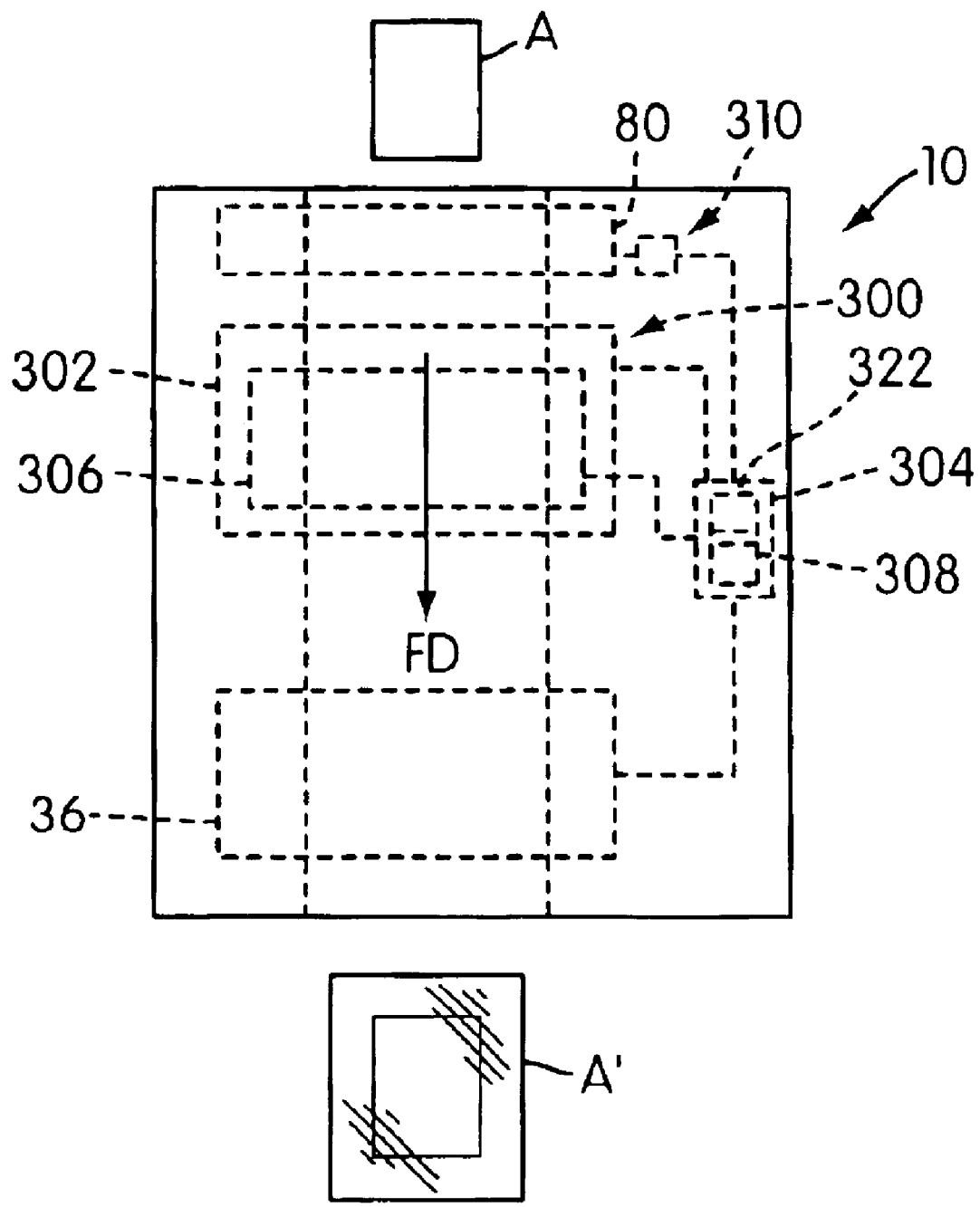
FIG. 15 is a schematic view of the apparatus.

FIG. 15 is a schematic drawing of the apparatus 10. As shown, an article processing assembly 300 includes a heating system 302 comprising the heating elements 100, 102 described above. The heating elements 100, 102 are connectable to a control system, indicated at 304 in FIG. 15. The article processing assembly 300 also includes cooperating pressure applying structures in the form of a roller system 306. The roller system 306 in the illustrated embodiment schematically represents the drive system 50, the feed rollers 26, the pressure applying rollers 32, 34, and the secondary drive rollers 38, 40. The article processing assembly 300 carries out the processing operation described hereinabove to produce the processed article A'. Further, the apparatus 10 includes the cutter 36. As shown, each of the article processing assembly 300 (including the heating system 302 and the roller system 306) and the cutter 36 are operatively connected to the control system 304, which includes a power source 308 operatively connected with the heating system 302, the roller system 306, and the cutter 36. The control system 304 may utilize a control panel 309, as shown in FIG. 1, to allow the user to monitor and control the article processing assembly 300 and the cutting assembly 36.

The article processing assembly 300 may have any construction suitable for heating the laminating materials and applying pressure to them. For example, instead of the arrangement illustrated in the Figures, the assembly 300 may use heat platens, heated rollers, a combination of these, or any suitable heating elements for applying heat to the laminating materials. Likewise, the assembly 300 may use an arrangement of rollers, fixed or passive roller bearing structures, or any other suitable structures for applying pressure to the materials.

The apparatus 10 may include a cartridge detector 310, as shown in FIG. 15. As stated above, feed rolls 82 may be mounted within the replaceable cartridge 80 to be thereby be removably connectable with the apparatus 10. There are various types of laminating material that may be wound onto the feed rolls 82 for use with the apparatus 10 and, as such, it is preferable for the apparatus 10 to be configurable to process various types of laminating materials. The heating system 302 may be controlled to emit substantially low heat (or no heat), to allow self adhesive laminating materials to be used with the apparatus, or a substantially high heat, to allow laminating materials with heat sensitive adhesive to be used. Additionally, laminating materials of different thicknesses may require heating (or no heating) at different temperatures from each other. As such, it is preferable for the heating system 302 to be controllable between various relative temperatures.

Also, it may be preferable for the article processing assembly 300 and, more specifically, the roller system 306 to be capable of operating at various speeds. It is contemplated that some types of laminating materials (such as those of relatively large thicknesses with heat sensitive adhesive) may require substantial exposure to the heating system 302 to impart the desired adhesion properties. As such, the rotational speed of the rollers (26, 32, 34, 38, and 40) may be relatively slowed such that the article A and the laminating materials B, C have a relatively long duration of exposure to the heating system 302. (It is noted that with a slowed feed rate, the cutting speed of the cutter 36 may also be relatively reduced to correspond to the reduced feed rate of the processed article A'.) Conversely, the rotational speed of the rollers (26, 32, 34, 38, and 40) may be relatively increased for relatively thin self adhesive types of laminating materials in order to speed processing time of these materials. (It is noted that with a relatively faster feed rate, the cutting speed of the cutter 36 may be relatively increased to correspond to the increased feed rate.)

Likewise, in certain applications it may be desirable to vary the pressure applied by the roller system 306, particularly in relation to the type of adhesive on the laminating materials. To accomplish this, a cam system, or some other suitable device, such as a piston system or rack/pinion system, could be used to apply a force to one or both rollers to increase the pressure.

Figure 16A:
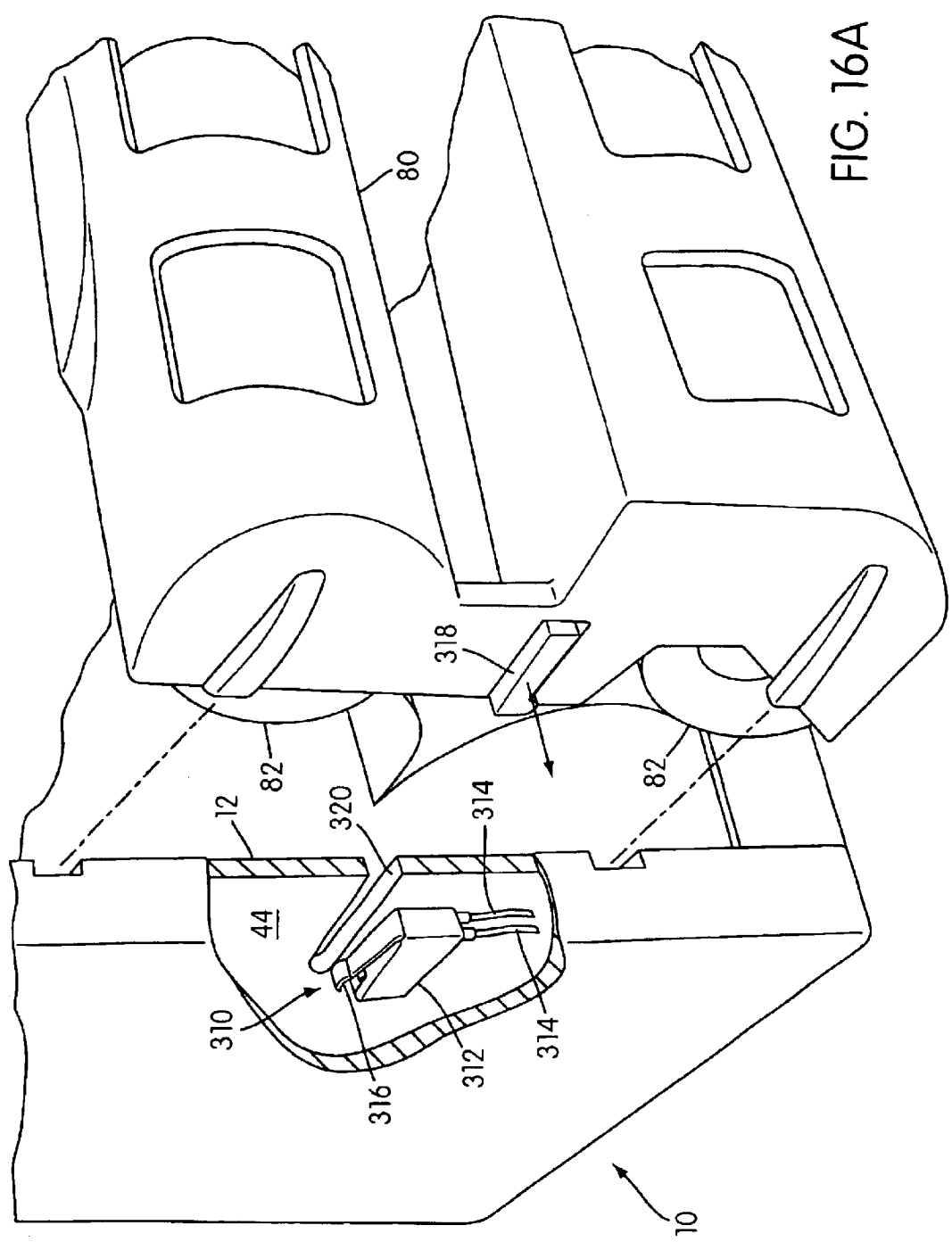
FIG. 16A is a partial rear perspective view showing an exemplary embodiment of the cartridge detection system.

FIG. 16A shows a contemplated embodiment of the cartridge detector 310. As shown, the frame 12 (shown as the wall portion 44) has a switching element 312 attached thereto. The switching element 312 is connectable with the control system 304 via wiring 314. The switching element 312 includes a contact member 316 that is movable between various switch positions to thereby allow the switching element 312 to relay corresponding various signals to the control system 304.

Shown in FIG. 16A, the replaceable cartridge 80 includes a detectable element 318 mounted thereon, or integral therewith, in a relative position so as to be cooperable with the switching element 312. The detectable element 318 is slidable within a receiving recess 320 in the wall portion 44. As the replaceable cartridge 80 is fitted within the apparatus 10, the detectable element 318 slidably engages within the receiving recess 320 so as to engage the contact member 316. Shown in FIG. 16A, the contact member 316 is biased toward a first, normal position (an uncontacted position) to be angularly spaced from the switching element 312. As the replaceable cartridge 80 is moved into position relative to the apparatus 10, the detectable element 318 may displace the contact member 316 from the normal position into a first switched position, indicated at 1P in FIG. 17. In the first switched position 1P, the switching element 312 may send (a) signal(s) to the control system 304 corresponding to one or more characteristics of the specific type of laminating material on the feed rolls of the particular replaceable cartridge 80. These characteristics may include adhesive type (e.g., degree of heat sensitivity or requisite bonding pressure) and/or thickness of the laminating material. A processor 322 of the control system 304 may then set one or more operating parameters of the article processing assembly 300 and cutter 36 to the specific requirements of the laminating materials, as indicated by the detectable element 318. Such parameters may include, feed rate of the material, temperature of the heating elements 100, 102, pressure of the rollers and/or cutting speed of the cutter 36.

It is contemplated that the replaceable cartridge 80 may contain different types of laminating material. As such, the configuration of the detectable element 318 on the cartridge is altered to represent the characteristics of the particular type of laminating material. For example, a relative thickness of the detectable element 318 may be increased to thereby be capable of displacing the contact member 316 into a different second switched position, indicated at 2P in FIG. 17. In the second switched position 2P, the switching element 312 may send (a) signal(s) to the control system 304 corresponding to heat sensitivity characteristics of the specific type of laminating material on the feed rolls of the particular replaceable cartridge 80. These characteristics may include thickness, type of adhesive, etc. As such, the processor 322 sets operating parameters of the article processing assembly 300 and the cutter 36 corresponding to the characteristics of the laminating materials, as indicated by the detectable element 318.

Figure 17:
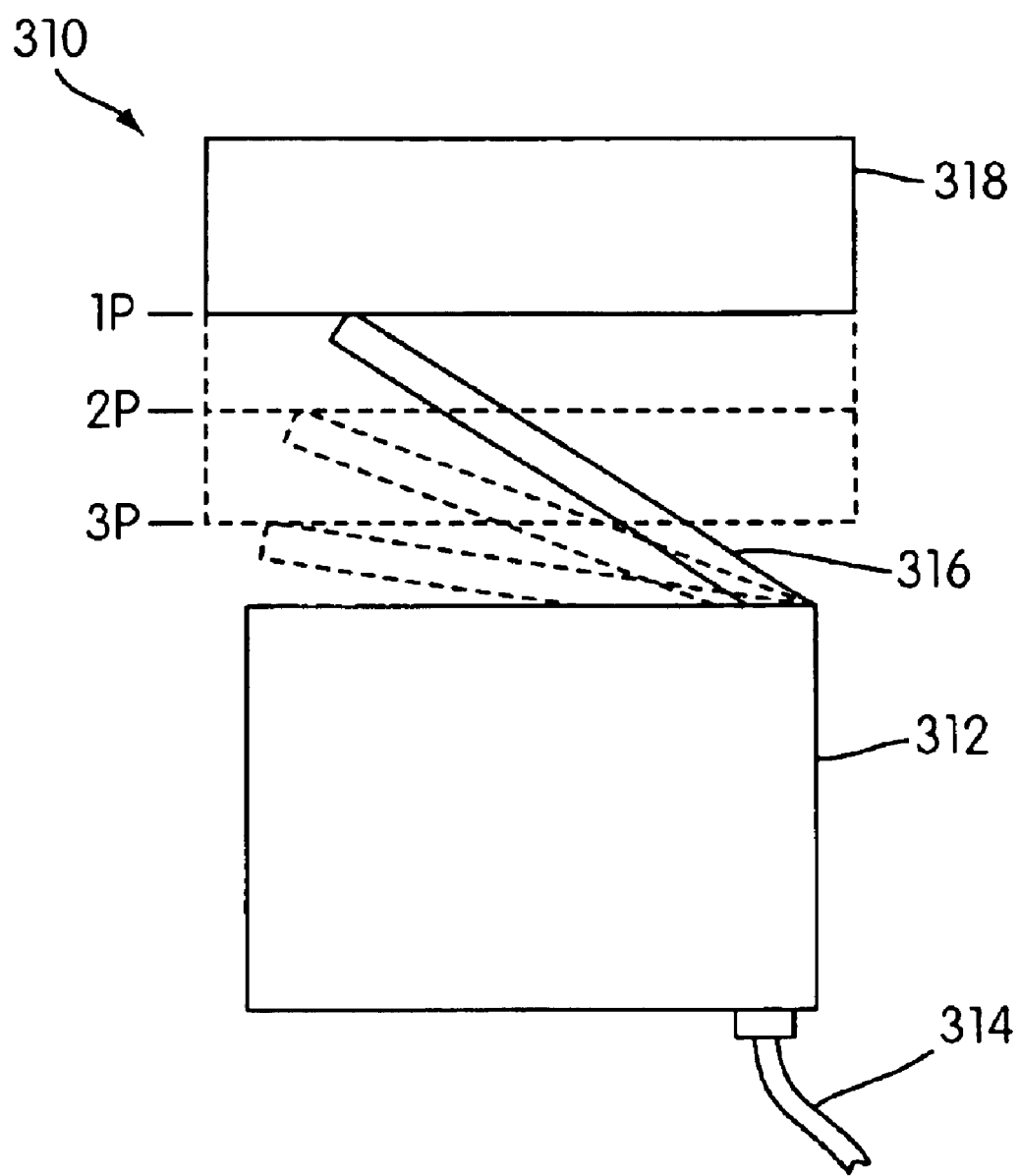
FIG. 17 is a schematic view of the cartridge detection system shown in FIG. 16A.

FIG. 17 shows the contact member 316 of the switching element 312 positionable within three distinct switch positions 1P–3P, corresponding to three different types of laminating materials, which may be used with the apparatus 10. It is contemplated that other positions are possible corresponding to various types of laminating materials that may be used by the apparatus 10.

Figure 16B:
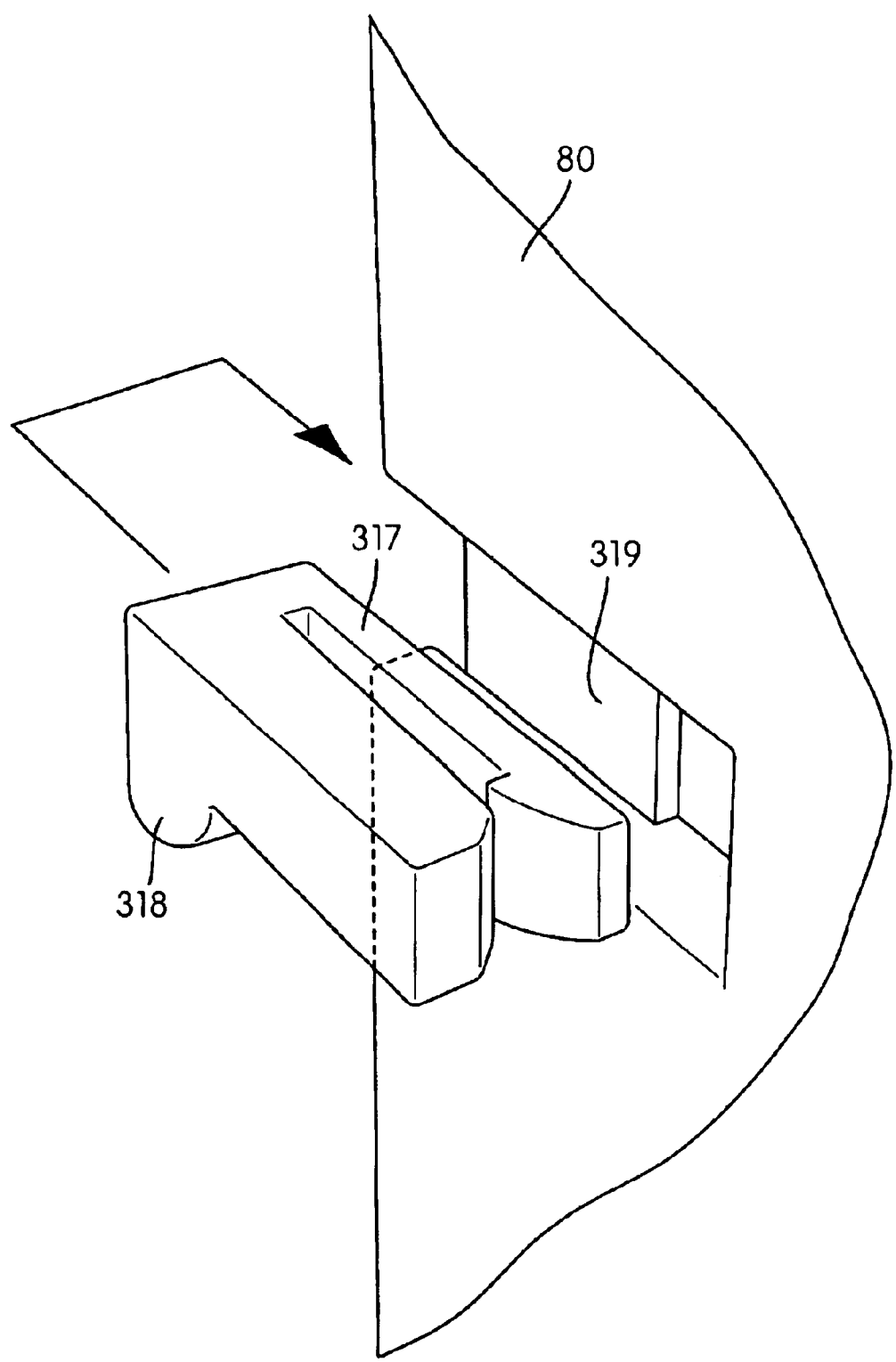
FIG. 16B is a partial perspective view showing a contemplated embodiment of the switch-engaging member of the cartridge detection system shown in FIG. 16A.

It is also contemplated that the detectable element 318 may be removably mounted to the cartridge 80, such as shown in FIG. 16B. In this case, feed rolls with various types of laminating materials thereon may be interchanged within the same cartridge 80, while a specific detectable element 318 may be mounted to the cartridge 80 to indicate to the control system 304 the type of laminating material being used. This technique may also reduce manufacturing costs by allowing a manufacturer to construct a single type of replaceable cartridge and to fit cartridges with a particular detectable element, corresponding to a specific type of laminating material therein.

Shown in FIG. 16B, the detectable element 318 includes a clip member 317. A receiving recess 319 within the cartridge 80 allows the detectable element 318 to be removable clipped thereto. As discussed above, detectable elements with different configurations may be used and clipped to the cartridge 80 to indicate different types of laminating materials in use therewith.

Figure 18:
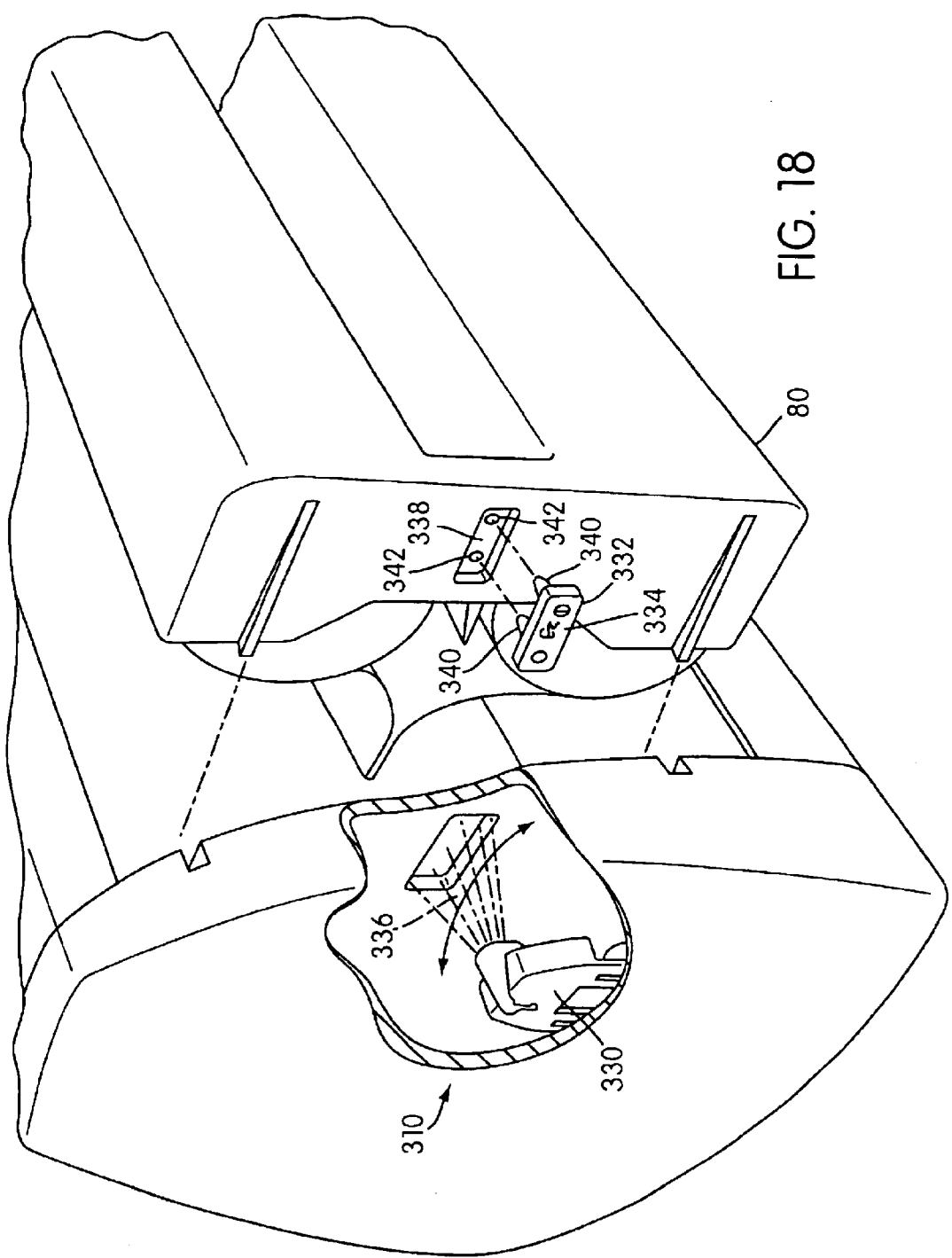
FIG. 18 is a rear perspective view of the apparatus with another exemplary embodiment of the cartridge detection system.

FIG. 18 shows another contemplated embodiment of the cartridge detection system 310. In this embodiment, the apparatus 10 includes a photo-electric sensor 330 mounted thereto and connectable to the control system 304. The replaceable cartridge 80 has a detectable element 332, in the form of a sensor plate. As shown, the detectable element 332 has identifying reflective markings 334 thereon. Once the cartridge 80 is mounted within the apparatus 10, a beam (indicated at 336) of the photo-electric sensor 330 may be directed onto the detectable element 332. The reflective markings 334 on the detectable element 332 reflect a portion of the beam 336 back to the photo-electric sensor 330. In this manner, the photo-electric sensor 330 may send a signal to the control system 304 corresponding to the specific reflective markings 334 on the detectable element 332. The reflective markings 334 on the detectable element 332 may be arranged so as to indicate associated characteristic(s) of laminating materials present within the replaceable cartridge 80.

As with the detectable element 318 previously discussed, the detectable element 332 may be removable mounted to the cartridge 80. As such, the same type of cartridge 80 may be fitted with feed rolls with different types of laminating materials thereon and with corresponding detectable element 332 to indicate the characteristic(s) of the laminating material.

Figure 19A:
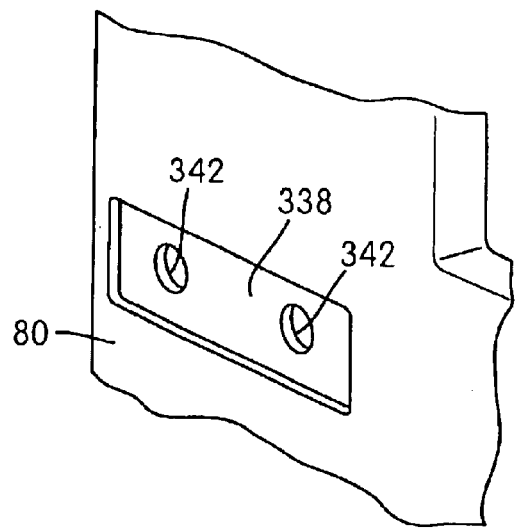
FIG. 19A shows a detectable element-receiving recess within the apparatus 10.

FIG. 19A shows a detectable element receiving recess 338 within the cartridge 80 within which the detectable element 332 may be disposed. Shown in FIG. 18, the detectable element 332 includes a pair of connecting elements 340 extending outwardly therefrom, which may pass through respective opening 342 within the cartridge 80. It is contemplated that the detectable element 332 may be permanently attached to the cartridge 80 by swaging or otherwise deforming the connecting elements 340 such that the connecting elements 340 are fixedly secured within the openings 342. However, it is also contemplated that the detectable element 332 may be removably attached to the cartridge, such as with clips (not shown) engagable with the connecting elements 340, or by a snap fit cooperation between the connecting elements 340 and openings 342.

Figure 19B:
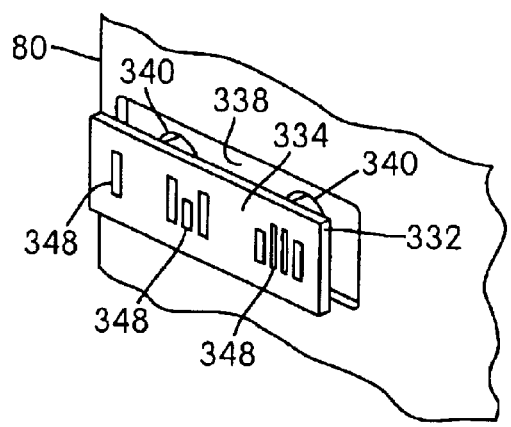
FIG. 19B shows one embodiment of the detectable element just prior to placement thereof within the recess shown in FIG. 19A.
Figure 19C:
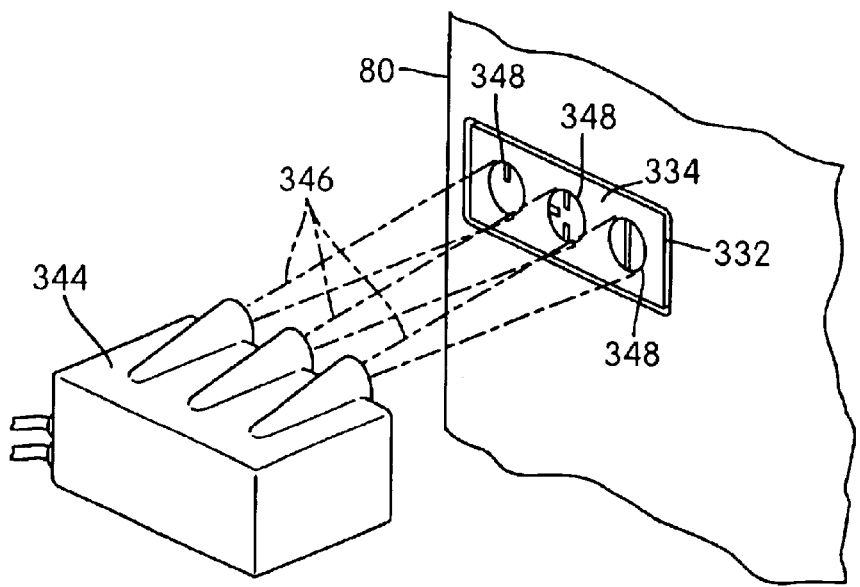
FIG. 19C shows a photo-electric sensor emitting a detection beam toward one embodiment of the detectable element.

FIGS. 19B and 19C show alternate configurations of the reflective markings 334, which may be used to indicated different laminating materials with different heat sensitivity characteristics. Further, an alternate embodiment of the photo-electric sensor 330 is shown as photo-electric sensor 344. The photo-electric sensor 344 is shown to emit three beams, indicated at 346, which may respectively correspond to three marking portions 348 of the reflective markings 334. The three respective beams 346 and marking portions 348 may correspond to three distinct characteristics of the laminating material indicated. Alternatively, the three respective beams 346 and marking portions 348 may indicate to the control system 304 three (or more, or less) distinct operating parameters (e.g., feed rate, heating temperature, cutting speed, etc.).

Figure 20:
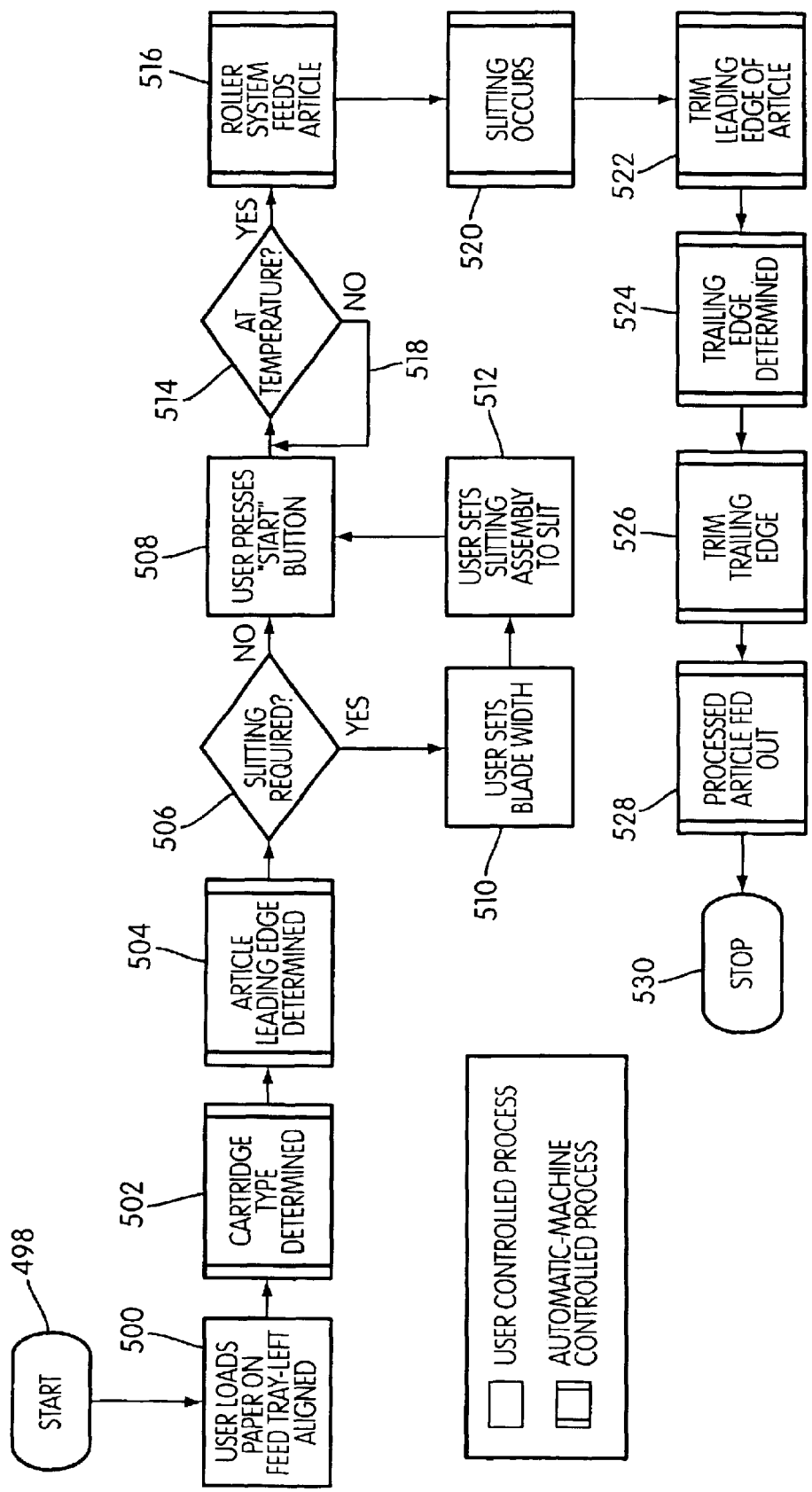
FIG. 20 is a flow chart outlining steps in the operating process of the laminating apparatus shown in the above Figs.

The detailed operation of the apparatus 10 is now described with reference to FIG. 20. Upon deciding to perform the processing operation (indicated as a start step 498), a user loads the article (e.g., document, card, photo, etc.) onto the feed tray 18 aligned to the left side thereof, indicated at step 500. At step 502, the control system 304 determines the type of cartridge 80 installed and, more specifically the type of laminating material within the cartridge 80 via the detector 310. Further, the control system 304 activates the heating system 302 corresponding to the type of laminating material present in the cartridge 80. The apparatus 10 then determines the relative position of a leading edge of the article, indicated at step 504. A determination is made at step 506 as to whether or not slitting of the processed article is required. If not, then the user may depress a start button to activate the apparatus 10, at step 508. If, in step 506, a determination is made to trim the processed article, then the user may manually set the blade width (i.e., the position of the blade 254) (indicated at step 510) and the slitting assembly 250 to trim the processed article (indicated at step 512). Subsequent to setting the slitting assembly 250 to trim the processed article in step 512, the user may activate the apparatus 10 by depressing a start button, as indicated in step 508. After activation, a determination is made in step 514 as to whether or not the heating system 302 is at the correct temperature for the laminating material being used indicated in step 502. If the correct temperature has been reached, the roller system 306 may then be activated to feed the article and laminating materials to the pressure applying structures 32, 34, indicated by step 516. If it is determined that the correct temperature has not been obtained, then a delay loop, indicated by line 518 is performed by the processor 322 until it is determined that the correct temperature has been reached. Step 520 indicates that slitting of the processed article occurs while the processed article exits the pressure applying structures 32, 34. The control system 304 triggers cutter 36 to trim the leading edge of the processed article as the leading edge exits the secondary drive rollers 38, 40, indicated at step 522. In step 524, the apparatus 10 detects the trailing edge of the article prior to being fed between the pressure applying structures 32, 34. Then the control system 304 triggers the cutter 36 to thereby trim the trailing edge of the processed article, indicated in step 526. In step 528, the processed article is fed out of the apparatus 10. The operation of the apparatus 10 is completed with end step 530.

Figure 21:
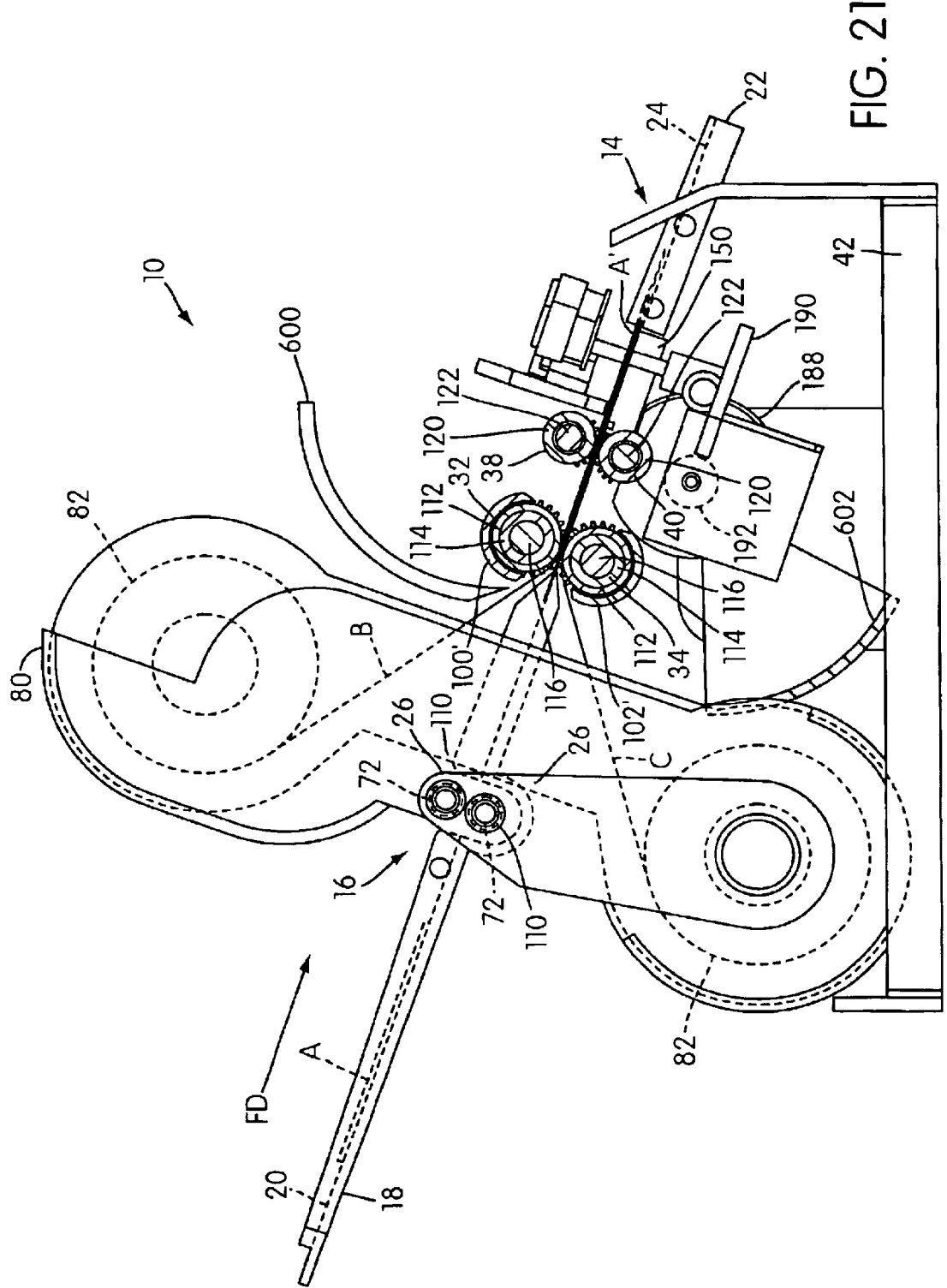
FIG. 21 is a cross-sectional view of the apparatus showing the upper frame member and side panels removed with the upper rollers in place and including a pair of heat shields with the lower heat shield in a retracted position.

Shown in FIG. 21, it may be preferable for the apparatus 10 to include a pair of heat shields 600, 602 to protect the user from accidental contact with heating elements 100', 102'. It is noted that the heating elements 100', 102' are shown as not including laminating material heating portions, as the heating elements 100, 102 include. However, it is, of course, possible to use the heat shields 600, 602 with either of the heating elements 100, 102 or 100', 102'. It is also contemplated that configurations of the heat shields 600, 602, other than as shown, are possible and may be preferable.

The upper heat shield 600 is positioned adjacent to and rearwardly of the heating element 100'. It is contemplated that the upper heat shield 600 may be mounted to the frame 12. More specifically, respective ends of the upper heat shield 600 may be mounted to the laterally spaced upstanding walls 44, 46 of the frame 12. The upper heat shield 600 is illustrated with an arcuate configuration. It is noted that it may be advantageous for the upper heat shield 600 to be arcuately shaped so as to deflect outwardly directed heat emitted by the heating element 100'. However, any configuration of the upper heat shield 600 is possible that limits access to the upper heating element 100' to thereby substantially prevent the user from inadvertently contacting the upper heating element 100'.

Also shown in FIG. 21, the lower heat shield 602 is positioned and configured to prevent accidental user contact with the lower heating element 102'. The lower heat shield 602 may be pivotally mounted to the frame 12, so as to be pivotally movable between a retracted position, shown in FIG. 21, and a deployed shielding position, shown in FIG. 22. It is contemplated that respective ends of the heat shield 602 are pivotally mounted to the upstanding walls 44, 46 of the frame 12. Further, the lower heat shield 602 is resiliently biased by a torsion spring (or any other suitable structure for generating a biasing force) toward the deployed position thereof. FIG. 21 shows the apparatus 10 with the cartridge 80 in position relative thereto. The lower heat shield 602 is in the retracted position thereof positioned generally below and rearward of the lower heating element 102'. Shown in FIG. 22, the lower heat shield 602 is in a deployed shielding position thereof, disposed adjacent to and rearward of the lower heating element 102'. Upon removal of the cartridge 80 and/or feed rolls 82, the lower heat shield 602 pivotally moves under the bias thereof toward and into the deployed shielding position, such that the lower heating element 102' is protected (i.e., the lower heat shield 602 is positioned so as to limit access to the lower heating element 102'), thereby substantially preventing the user from inadvertently contacting the lower heating element 102'.

It will thus be seen that the aspects of this invention have been fully and effectively accomplished. It will be realized however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An article laminating apparatus for use with a pair of feed rolls carrying a supply of laminating material to be unwound, at least one of the laminating materials including a layer of adhesive provided thereon, said apparatus comprising:

a frame constructed and arranged to enable the feed rolls to be mounted thereon;

an article processing assembly carried on said frame such that an article can be inserted into said article processing assembly in a feeding direction;

said article processing assembly including a pair of cooperating pressure applying structures and a pair of heating elements;

said heating elements each having pressure applying structure heating portions positioned in heat transferring relation adjacent said respective pressure applying structures so as to transfer heat to said respective pressure applying structures;

said heating elements each having laminating material heating portions positioned such that, when the laminating materials are unwound and fed between said pressure applying structures, said laminating material heating portions are positioned in heat transferring relation adjacent a lengthwise portion of the respective laminating materials extending between said pressure applying structures and the respective feed rolls so as to transfer heat to the laminating materials prior to advancing between the pressure applying structures;

wherein said laminating heating portions and said pressure applying structure heating portions of said heating elements are integrally formed as one-piece;

said article processing assembly being constructed and arranged to perform an article processing operation wherein portions of the laminating materials are initially heated by the laminating material heating portions of said heating elements prior to advancement between said pressure applying structures and wherein the article and laminating materials are then simultaneously heated and compressed between said pressure applying structures.

2. An apparatus according to claim 1, wherein each of pressure applying structure heating portions is configured to have an arcuate surface conforming to a partial exterior periphery of said respective pressure applying structure.

3. An apparatus according to claim 2, wherein each of said laminating material heating portions is configured to extend from said respective pressure applying structure heating portion generally toward the respective feed roll.

4. An apparatus according to claim 2, wherein a surface of each of said laminating material heating portions is curved to conform to a feed path defined by the respective laminating material as the laminating material is fed from the respective feed roll into said article processing assembly in the feeding direction.

5. An apparatus according to claim 1, wherein the feed rolls are housed within a replaceable cartridge, said replaceable cartridge being removably mountable to said frame.

6. An article laminating apparatus for use with a pair of feed rolls carrying a supply of laminating material to be unwound, at least one of the laminating materials including a layer of adhesive provided thereon, said article laminating apparatus comprising:

a frame constructed and arranged to enable the feed rolls to be mounted thereto;

an article processing assembly carried on said frame such that, when the feed rolls are removably mounted thereto, an article can be inserted into said article processing assembly together with the laminating materials unwound from their respective feed rolls and disposed on opposing sides of the article, said article processing assembly including cooperating pressure applying structures and one or more heating elements;

a control system controlling said article processing assembly to perform an article processing operation wherein a temperature of the one or more heating elements is elevated to enable the adhesive to adhere to the article inserted into said processing assembly and said cooperating pressure applying structures apply pressure to the laminating materials and the article to affect adhesive bonding therebetween; and a cutter system including a blade mounted on a guide structure for a cutting movement to enable said blade to cut transversely through the bonded materials discharged from said article processing assembly;

said guide structure being oriented at a non-perpendicular angle with respect to a feeding direction in which the article and laminating materials advance through the article processing assembly such that said blade moves along a cutting path oriented at said non-perpendicular angle, said angle and a velocity at which said blade moves along said cutting path being related such that a velocity component at which said blade moves in the feeding direction along the cutting path is substantially identical to a feed rate at which said article and laminating materials are advanced in the feeding direction so that the laminating materials are cut generally perpendicularly with respect to the feeding direction.

7. An apparatus according to claim 6, wherein said cutter is disposed adjacent a discharge side of said article processing assembly, said cutter including a guide member connected to said frame and disposed at said non-perpendicular angle with respect to the feeding direction such that a first end portion of said guide member is spaced relatively farther from said article processing assembly than a second end portion thereof opposite said first end portion, said cutter including a movable cutting member slidably mounted on said guide member for movement thereon in a first cutting direction toward said second end portion and a second return direction toward said first end portion.

8. An apparatus according to claim 7, wherein said movable cutting member includes a tripping member, said tripping member having said blade thereon, said tripping member being pivotably mounted to said movable cutting member for pivotal movements between (1) a first cutting position wherein a portion of said blade extends downwardly toward said article supporting surface to cut through the article and laminating materials during movement of said movable cutting member in said first cutting direction and (2) a second return position wherein said tripping member is pivoted relative to said first cutting position such that said blade is disposed above the article and laminating materials during movement of said movable cutting member in said second return direction.

9. An apparatus according to claim 8, wherein said tripping member includes an arm member connected to said thereto, said arm member constructed and arranged to engage a tripper structure on said second end portion of said guide member upon completion of movement of the movable cutting member in the first cutting direction to thereby move said tripping member from the first cutting position toward and into said second return position such that said blade is disposed in said second return position during movement of said movable cutting member in said second return direction, said arm member constructed and arranged to engage another tripper structure on said first end portion of said guide member upon completion of movement of said movable cutting member in the second return direction to thereby move said tripping member from said second traveling position toward and into said first cutting position such that said blade is disposed in said first cutting position during movement of said movable cutting member in said first cutting direction.

10. An apparatus according to claim 9, wherein said cutter includes a cutting platform mountable to said frame adjacent said discharge side of said article processing assembly and disposed below said movable cutting member, said cutting platform including a downwardly recessed groove therein coextending said cutting path within which a portion of said blade is disposed when said tripping member is in said cutting position thereof.

11. An apparatus according to claim 10, wherein said cutter further comprises a drive assembly, said drive assembly comprising:

a drive motor;

a shaft member operatively coupled to said drive motor to produce rotational movement thereof in either clockwise or counter-clockwise directions.

12. An apparatus according to claim 11, wherein said drive assembly further comprises:

a drive pulley member connected to one end of said shaft member;

a driven pulley member rotatably connectable with said cutting platform and parallel to said drive pulley member; and a serpentine belt member extending between and operatively engaging each of said drive and driven pulley members to be rotatable about said drive and driven pulley members in winding relation therearound.

13. An apparatus according to claim 12, wherein said movable cutting member is connectable to a portion of said serpentine belt member such that said movable cutting member is movable by said belt member along said guide member in either of said first cutting direction or said second return direction.

14. An apparatus according to claim 6, wherein the feed rolls are housed within a replaceable cartridge, said replaceable cartridge being removably mountable to said frame.

15. An apparatus according to claim 14, further comprising a detector communicated with said control system and operable to detect a detectable element on the replaceable cartridge, the detectable element being indicative of a characteristic of the laminating materials carried on the feed rolls;

wherein the control system is operable to adjust at least one parameter of said article processing operation based on the signal indicative of the characteristic of the laminating materials.

16. An apparatus according to claim 15, wherein the at least one parameter adjusted by the control system includes the feed rate at which the article and the laminating materials are advanced in the feeding direction, the control system also adjusting the velocity at which the blade moves along said cutting path based on the characteristic of the laminating materials so that the velocity component at which the blade moves in the feeding direction along the cutting path continues to be substantially identical to the feed rate.

17. An article laminating apparatus for use with a cartridge having a pair of feed rolls carrying a supply of laminating material to be unwound, at least one of the laminating materials including a layer of adhesive provided thereon, the cartridge having a detectable element indicative of a characteristic of the laminating materials, said article laminating apparatus comprising:

a frame constructed and arranged to enable the cartridge to be removably mounted thereto;

an article processing assembly carried on said frame such that, when the cartridge is removably mounted thereto, an article can be inserted into said article processing assembly in a feeding direction together with the laminating materials unwound from their respective feed rolls and disposed on opposing sides of the article, said article processing assembly including cooperating pressure applying structures and one or more heating elements;

a control system controlling said article processing assembly to perform an article processing operation wherein (a) a temperature of the one or more heating elements is elevated to enable the adhesive to adhere to the article inserted into said processing assembly and (b) said cooperating pressure applying structures apply pressure to the laminating materials and the article to affect adhesive bonding therebetween;

a detector operable to detect the detectable element on the cartridge, said detector being communicated to the control system and being operable to transmit a signal indicative of the characteristic of the laminating material based on the detectable element on the cartridge;

said control system being operable to adjust at least one parameter of said article processing operation based on the signal indicative of the characteristic of the laminating materials;

a cutter for cutting transversely through the laminating materials wherein said cutter includes a blade mounted for transverse movement to enable said blade to cut transversely through the laminating materials;

wherein said cutter includes a motor operable to move said blade transversely to transversely cut said laminating materials;

wherein said blade moves along a cutting path oriented at a non-perpendicular angle with respect to the feeding direction in which the article and the laminating materials advance through the article processing assembly such that the blade moves along a cutting path oriented at said non-perpendicular angle, said angle and a velocity at which said motor moves said blade along said cutting path being related such that a velocity component at which said blade moves in the feeding direction along said cutting path is substantially identical to a feed rate at which the article and the laminating materials are advanced in the feeding direction so that the laminating materials are cut generally perpendicularly with respect to the feeding direction;

wherein the at least one parameter adjusted by the control system includes the feed rate of the article and laminating materials through the article processing assembly;

the control system also adjusting the velocity at which the blade moves along said cutting path based on the signal indicative of the characteristic of the laminating materials so that the velocity component at which the blade moves in the feeding direction along the cutting path continues to be substantially identical to the feed rate.

18. An article laminating system comprising:

a cartridge having a pair of feed rolls carrying a supply of laminating material to be unwound, at least one of said laminating materials including a layer of adhesive provided thereon, said cartridge having a detectable element indicative of a characteristic of the laminating materials;

a frame constructed and arranged to enable said cartridge to be removably mounted thereto;

an article processing assembly carried on said frame such that, when said cartridge is removably mounted thereto, an article can be inserted into said article processing assembly in a feeding direction together with said laminating materials unwound from their respective feed rolls and disposed on opposing sides of the article, said article processing assembly including cooperating pressure applying structures and one or more heating elements;

a control system controlling said article processing assembly to perform an article processing operation wherein (a) a temperature of the one or more heating elements is elevated to enable the adhesive to adhere to the article inserted into said processing assembly and (b) said cooperating pressure applying structures apply pressure to said laminating materials and the article to affect adhesive bonding therebetween;

a detector operable to detect said detectable element on said cartridge, said detector being communicated to said control system and being operable to transmit a signal indicative of the characteristic of said laminating material based on said detectable element on said cartridge;

said control system being operable to adjust at least one parameter of said article processing operation based on the signal indicative of the characteristic of the laminating materials;

a cutter for cutting transversely through the laminating materials wherein said cutter includes a blade mounted for transverse movement to enable said blade to cut transversely through the laminating materials;

wherein said cutter includes a motor operable to move said blade transversely to transversely cut said laminating materials;

wherein said blade moves along a cutting path oriented at a non-perpendicular angle with respect to the feeding direction in which the article and the laminating materials advance through the article processing assembly such that the blade moves along a cutting path oriented at said non-perpendicular angle, said angle and a velocity at which said motor moves said blade along said cutting path being related such that a velocity component at which said blade moves in the feeding direction along said cutting path is substantially identical to a feed rate at which the article and the laminating materials are advanced in the feeding direction so that the laminating materials are cut generally perpendicularly with respect to the feeding direction;

wherein the at least one parameter adjusted by the control system includes the feed rate of the article and laminating materials through the article processing assembly;

the control system also adjusting the velocity at which the blade moves along said cutting path based on the signal indicative of the characteristic of the laminating materials so that the velocity component at which the blade moves in the feeding direction along the cutting path continues to be substantially identical to the feed rate.

* * * * *

UNITED STATES PATENT AND TRADEMARK OFFICE
CERTIFICATE OF CORRECTION

PATENT NO.   : 6,805,179 B2
DATED        : October 19, 2004
INVENTOR(S)  : Joseph Elijio Velasquez et al.

It is certified that error appears in the above-identified patent and that said Letters Patent is hereby corrected as shown below:

Column 3,
Line 30, replace "are-" with -- are --.

Column 9,
Line 41, replace "on-the" with -- on the --.

Column 19,
Line 59, replace "traveling" with -- return --.

Signed and Sealed this

Twenty-second Day of February, 2005

JON W. DUDAS
*Director of the United States Patent and Trademark Office*